US006005493A

United States Patent [19]
Taniguchi et al.

[11] Patent Number: 6,005,493
[45] Date of Patent: Dec. 21, 1999

[54] METHOD OF DISPLAYING MOVING OBJECT FOR ENABLING IDENTIFICATION OF ITS MOVING ROUTE DISPLAY SYSTEM USING THE SAME, AND PROGRAM RECORDING MEDIUM THEREFOR

[75] Inventors: Katumi Taniguchi, Tokyo; Takafumi Miyatake, Hachioji; Akio Nagasaka; Takehiro Fujita, both of Kokubunji, all of Japan

[73] Assignee: Hitachi, Ltd., Tokyo, Japan

[21] Appl. No.: 08/937,300

[22] Filed: Sep. 22, 1997

[30] Foreign Application Priority Data

Sep. 20, 1996  [JP]  Japan .................................... 8-249591

[51] Int. Cl.$^6$ ................................................... G08G 1/123
[52] U.S. Cl. .......................... 340/990; 348/155; 382/103; 382/206
[58] Field of Search ..................................... 340/990, 992; 382/206, 103, 312, 291, 115, 118; 701/201; 348/155; 345/474, 475

[56] References Cited

U.S. PATENT DOCUMENTS

| | | | |
|---|---|---|---|
| 5,099,324 | 3/1992 | Abe ......................................... | 348/155 |
| 5,243,418 | 9/1993 | Kuno et al. .............................. | 382/103 |
| 5,383,128 | 1/1995 | Nishida et al. .......................... | 340/990 |
| 5,422,812 | 6/1995 | Knoll et al. .............................. | 340/990 |
| 5,459,824 | 10/1995 | Kashiwazaki ........................... | 340/990 |
| 5,500,904 | 3/1996 | Markandey et al. .................... | 382/103 |
| 5,588,067 | 12/1996 | Peterson et al. ......................... | 382/103 |
| 5,721,692 | 2/1998 | Nagaya et al. ........................... | 382/206 |
| 5,757,290 | 5/1998 | Watanabe et al. ....................... | 340/990 |

FOREIGN PATENT DOCUMENTS 8-221577  8/1996  Japan .

OTHER PUBLICATIONS

H. Nakai et al., "Detection of Moving Objects with Three Level Continuous Modules", *Transactions of the Institute of Electronics, Information and Communication Engineers*, D–II, vol. J77–D–II, No. 7, Jul. 1994, pp. 1209–1218 (in Japanese).

T. Nakanishi et al., "Automatic Vehicle Image Extraction Based on Spatio–Temporal Image Analysis", *Transactions of the Institute of Electronics, Information and Communication Engineers*, D–II, vol. J77–D–11, No. 9 Sep. 1994, pp. 1716–1726 (in Japanese).

*Primary Examiner*—Jeffery A. Hofsass
*Assistant Examiner*—John Tweel, Jr.
*Attorney, Agent, or Firm*—Antonelli, Terry, Stout & Kraus, LLP

[57] ABSTRACT

In order to reduce the load on the operator in monitoring a moving object in the moving picture signal supplied from the imaging device, the signal is displayed in one region of the display device. The moving route of the moving object which has entered the view of the imaging device is extracted, based on the signal. The first image data showing the image of a moving route of an extracted moving object is generated, and the second image data showing the image of the moving object is generated based on the signal. The overlapped image of the image of the moving route and the image of the moving object is displayed in another region of the display device together with the extraction time of the image of the moving object. The processing above is repeated to other moving objects which enter the view later on. The overlapped images for different moving images thus extracted are displayed adjacent to each other in the region.

37 Claims, 24 Drawing Sheets

FIG. 4

| | | |
|---|---|---|
| PROGRAM | | 5-1 |
| DATA STRUCTURE OF MOVING OBJECT IMAGE WITH ROUTE | | 5-2 |
| THRESHOLD A | | 5-3 |
| THRESHOLD B | | 5-4 |
| FRAME IMAGE DATA | RED IMAGE DATA [160][120] | 5-5-1 |
| | GREEN IMAGE DATA [160][120] | 5-5-2 |
| | BLUE IMAGE DATA [160][120] | 5-5-3 |
| HORIZONTAL EDGE DATA [160][120] | | 5-6 |
| VERTICAL EDGE DATA [160][120] | | 5-7 |
| HORIZONTAL EDGE DATA OF PRECEDING FRAME [160][120] | | 5-8 |
| VERTICAL EDGE DATA OF PRECEDING FRAME [160][120] | | 5-9 |
| TIME VARIANT HORIZONTAL EDGE DATA [160][120] | | 5-10 |
| TIME VARIANT VERTICAL EDGE DATA [160][120] | | 5-11 |
| TIME VARIANT EDGE DATA [16][12] | | 5-12 |
| TIME VARIANT EDGE DATA OF PRECEDING FRAME [16][12] | | 5-13 |
| MOVEMENT CHARACTERISTICS REGION DATA [16][12] | | 5-14 |
| HISTOGRAM DATA [16][12][64] | | 5-15 |
| REGION-REPRESENTATIVE COLOR DATA [16][12] | | 5-16 |
| REGION-REPRESENTATIVE COLOR DATA OF PRECEDING FRAME [16][12] | | 5-17 |
| REGION-REPRESENTATIVE COLOR DATA OF FURTHER PRECEDING FRAME [16][12] | | 5-18 |
| IMAGE CHANGE REGION DATA [16][12] | | 5-19 |
| REGION IMAGE CHANGE DATA OF PRECEDING FRAME [16][12] | | 5-20 |
| ROUTE REGION DATA [16][12] | | 5-21 |
| ROUTE IMAGE DATA | ROUTE RED IMAGE DATA [160][120] | 5-22-1 |
| | ROUTE GREEN IMAGE DATA [160][120] | 5-22-2 |
| | ROUTE BLUE IMAGE DATA [160][120] | 5-22-3 |
| | ROUTE TRANSPARENCY DEGREE DATA [160][120] | 5-22-4 |
| MOVING OBJECT IMAGE DATA | RED IMAGE DATA [160][120] | 5-23-1 |
| | GREEN IMAGE DATA [160][120] | 5-23-2 |
| | BLUE IMAGE DATA [160][120] | 5-23-3 |

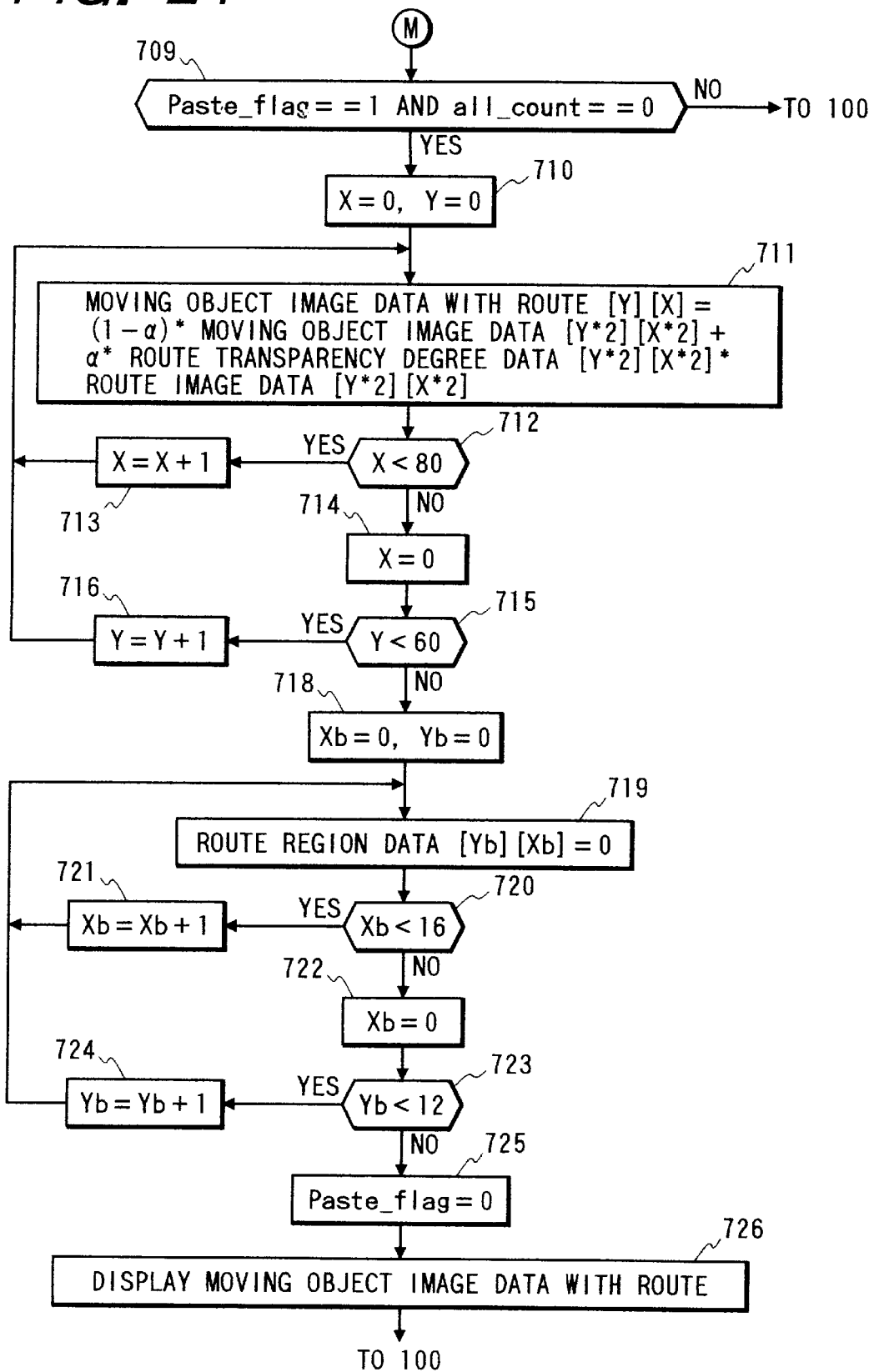

METHOD OF DISPLAYING MOVING OBJECT FOR ENABLING IDENTIFICATION OF ITS MOVING ROUTE DISPLAY SYSTEM USING THE SAME, AND PROGRAM RECORDING MEDIUM THEREFOR

BACKGROUND OF THE INVENTION

The present invention relates to a moving object displaying method which extracts an object which moves in the view of a monitoring camera, etc., from an image which an imaging camera produces and displays it on the display device, a display system which uses the method, and a program recording medium therefor.

Monitoring of video produced by imaging cameras is executed in various places such as roads, railroad crossings, dams and convenience stores. These aim to prevent occurrence of the accidents and the crimes by observing the objects which appear in such specific places. Suspicious-looking persons are monitored, for instance, in convenience stores, and it is monitored whether human beings invade in those areas like the dams where the invasion is absolutely prohibited. It is now general that such monitoring is executed in such a manner that a person watches the video in real time or that the video is recorded on the storage medium like a video tape and is checked afterwards, so the monitoring is time-consuming work. The automation of the video monitoring with a computer is requested from such circumstances. Various methods have been proposed so far.

The article by H. Nakai et al., "Detection of Moving objects with Three Level Continuous Modules", *Transactions of the Institute of Electronics, Information and Communication Engineers*, D-II, Vol. J77-D-II, No. 7, July 1994, pp. 1209–1218 (hereafter called the first reference document), proposes a method of automatically detecting a moving object like a pedestrian etc. from a video by using the continuous processing module of three steps like detection of change, partial trucking, and movement interpretation. It also reports a result of an experiment to extract moving routes of passengers in a general shop. The article by T. Nakanishi et al., "Automatic Vehicle Image Extraction Based on Spatio-Temporal Image Analysis", *Transaction of the Institute of Electronics, Information and Communication Engineers*, D-II, Vol. J77-D-II , No. 9, September 1994, pp. 1716–1726 (hereafter called the second reference document), proposes a method of automatically extracting vehicles such as cars which run outdoors, by using the time space image processing. The Japanese laid-open patent application No. 8-221577 or its corresponding U.S. patent application Ser. No. 08/601,951, now U.S. Pat. No. 5,721,692, assigned to the present assignee proposes a method of detecting a moving object in outdoors, which sets a slit in an image, calculates correlation of the current image with the image of the background stored beforehand, detects a change in the image, thereby to detect a moving object. Systems are already in the market, which can monitor moving objects in outdoors, for example, a system of automatically recognizing car numbers of running cars.

SUMMARY OF THE INVENTION

In the prior art monitoring system, either the video obtained by the monitoring camera is displayed on the monitoring camera, when the video is acquired, or the image obtained by the monitoring camera is accumulated and the image is checked later on, so the time required of the monitoring of the video is either equal to the acquisition time of the video or is reduced only to the play back time at play back by the fast-forwarding. So, efficiency of the work of the operator of the monitoring camera has not been improved.

The experiment by Nakai et al. extracts the moving routes of passengers in a shop but no explanation is given as to how to associate the extracted routes with the images of passengers who passed through the extracted routes. In addition, the video of inside the shop is recorded on the VTR and the recorded video is used for this extraction. Therefore, this extraction cannot be executed in real time. Moreover, according to the technology adopted by Nakanishi et al., the monitoring target objects are limited to cars etc. which run straightly at a constant velocity. In the technology disclosed in the Japanese laid-open patent application No. 8-221577 or its corresponding U.S. patent application Ser. No. 08/601, 951, now U.S. Pat. No. 5,721,692, only the movement characteristics is used in order to detect a moving object. So, there is a problem that shaking parts of trees are also detected as part of moving objects. According to the system which is already on the market, it is necessary to execute an operation to exclude an area where there is an image of trees, from the monitoring target area, in order to execute the monitoring in outdoors correctly. So, it is impossible to automatically monitor moving objects in all natural environments. Moreover, the system requires a complex operation to change setting of the operation parameters whenever the monitoring position is changed. Thus, it was necessary to adjust setting of the operation parameters beforehand, in order to detect moving objects correctly in a natural environment which contains roadside trees and miscellaneous trees in the video.

It is the object of the present invention to provide a method of displaying moving objects which can reduce the load required of the operator to check the moving objects in the video, a display system using the method.

It is another object of the present invention to provide a method of displaying moving objects which can reduce the above mentioned load required of the operator in various natural environments and a system using the same.

To achieve the above objects, the method of displaying a moving object and the display system according to the present invention execute the following steps:

extracting a moving route of a moving object which enters a predetermined view of an imaging device, based on a moving picture signal provided by the imaging device;

generating first image data indicative of an image of the extracted moving route of the moving object;

generating second image data indicative of an image of the moving object, based on the moving picture signal; and displaying an overlapped image of the image of the moving object and the image of the moving route extracted for the moving object on a display device.

In a preferable mode of the present invention, the extracting step to the displaying step are repeated for at least one other moving object which enters that view after the moving object. The overlapped image for the first moving object and the overlapped image of the second moving object are displayed adjacent to each other on the display device.

In another preferable mode of the present invention, the image of the moving route of the moving object is displayed in a translucent color in an overlapping manner with the image of the moving object.

In further another preferable mode of the present invention, the image of the moving object is an image supplied by the imaging device, when the moving object is located in a predetermined area.

In further another preferable mode of the present invention, the image of the moving object is a reduced image of the image supplied by the imaging device, when the moving object is located in the predetermined area.

BRIEF DESCRIPTION OF THE DRAWINGS

FIG. 4 is a diagram indicative of a list of the program and data used in the apparatus of FIG. 1.

FIG. 24 is a flow chart of another part of the processing of displaying a moving object image with a route (700) in the flow chart of FIG. 3.

DESCRIPTION OF AN EMBODIMENT

Figure 1:
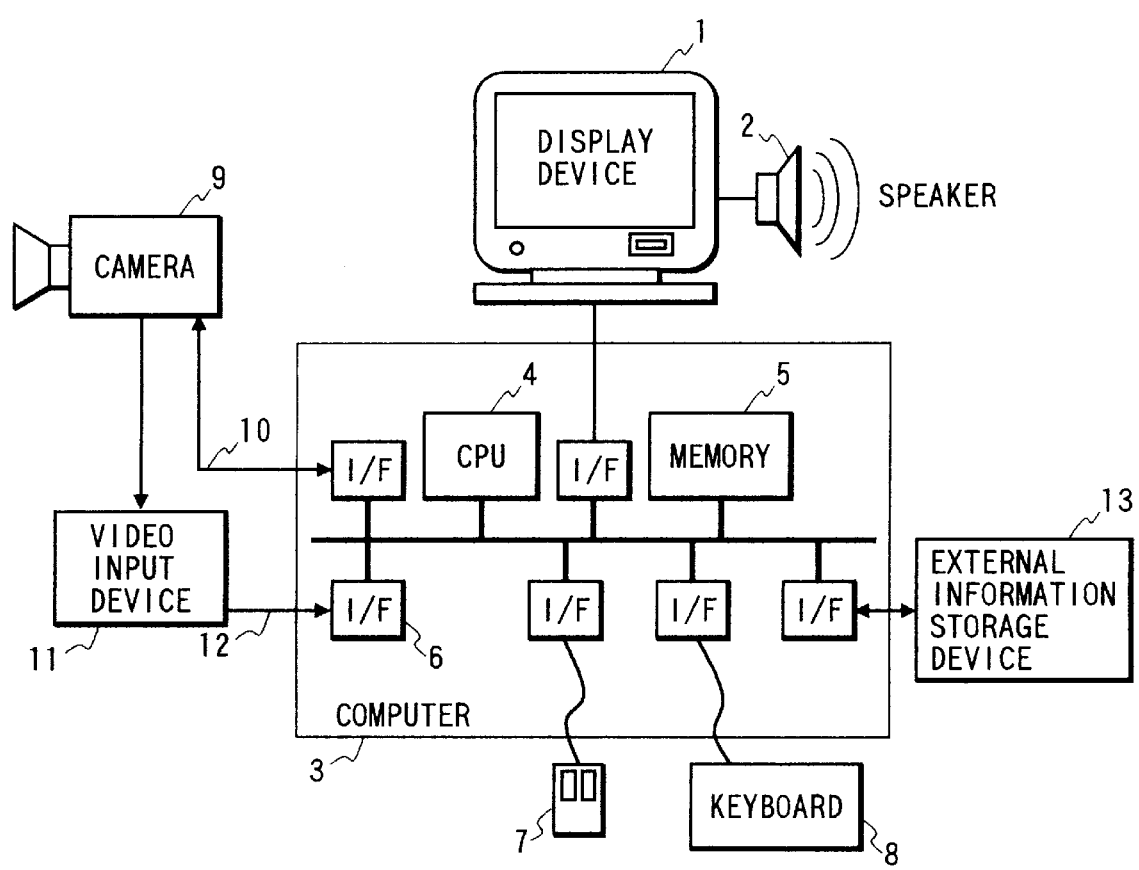
FIG. 1 is a schematic block diagram of an embodiment of the moving object display system according to the present invention.

The moving object display system according to the present invention will be explained in more details with reference to the embodiment or its modifications shown in the drawings.

(1) Outline of the Apparatus

In FIG. 1, the reference numeral 1 is a display device such as a CRT, and it displays the output screen of the computer 3. It is possible to send a command to the computer 3 by using a pointing device 7 such as a mouse etc. or a keyboard 8. Camera 9 is an imaging device. The video signal outputted from the camera 9 is converted by the video input device 11 sequentially into the digital image data 12 which the computer 3 can treat, and the image data is sent to the computer 3. The if digital image data 12 is stored in the memory 5 in the computer through the interface 6, and is processed by CPU 4 according to a program stored in the memory 5. Moreover, external memory 13 can store various information necessary for the processing. Various data or image data obtained by the processing is stored in the external memory 13. In addition, it is also possible to control the camera 9 by the control signal 10 from the computer. Various data made by the processing explained below is stored in the memory 5 and is referred to as occasion demands.

Figure 2:
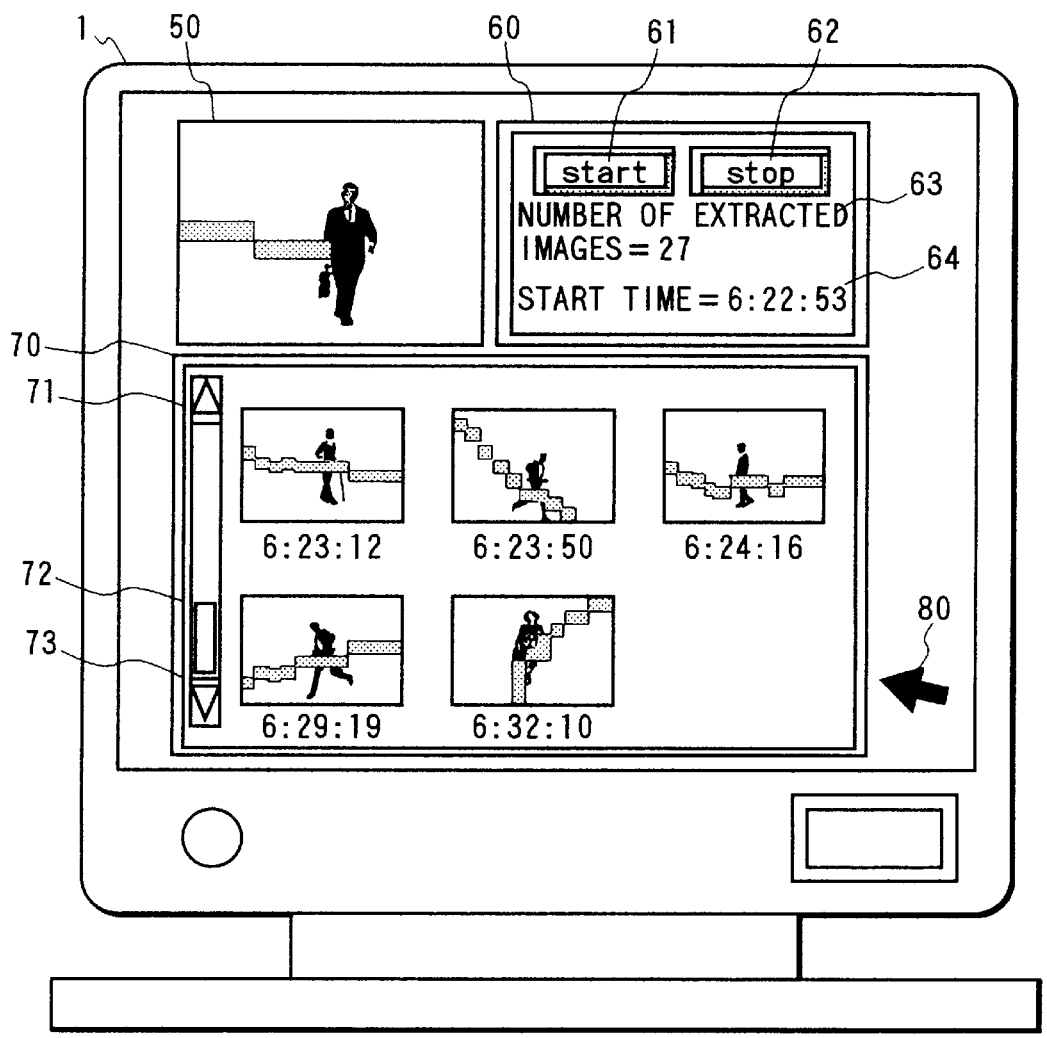
FIG. 2 is a diagram indicative of one example of a screen displayed on the display device in the apparatus of FIG. 1.

FIG. 2 is an example of the screen displayed on the display device 1. The region 50 is a display region of the inputted digital image data 12. The moving picture signal supplied by the camera 9 is displayed while the system is operating. The region 60 is a region where the buttons for controlling the present system and its operation status are displayed. The start button 61 in the region 60 is one which orders start of execution of the processing of displaying a moving object image with a route. The operation to push this button is executed by locating the cursor 80 by the operator on the button by means of the pointing device 7, and clicking it. The stop button 62 is one which orders stopping of execution of the processing. The reference numeral 63 indicates a total number of moving object images with a route which have been extracted until now after the execution start. The reference number 64 indicates the execution start time of the displaying processing. The region 70 is a display region of moving object images with a route. In the following, the camera 9 is assumed to be located outdoors where passages are provided such as roads or stairs etc. installed outside the building. A person is assumed to be a moving object. It is assumed that plural moving objects may enter the view of the camera at different timing but that only one moving object exists in the view at a time. That is, it is assumed that, after one moving object enters the view, another moving object enters the view after the one moving object exits from the view.

In the present system, when a moving object enters the view of the monitoring target, its moving route is automatically extracted. This extraction is continued until the moving object exits outside the view. As a result, the moving route is updated repeatedly. Image data is generated which represents the extracted moving route, so that the moving route is displayed in a translucent color in an overlapping manner with an image representing the moving object. When the moving object passes through a predetermined region, for instance a space corresponding to a slender region passing to the vertical direction at the center of the screen 50, the digital image data 12 at that time is reduced to an appropriate size, for instance ½, is stored as the image of the moving object, and the time when the moving object has passed through the predetermined region is stored as the extraction time of the image of the moving object. When the moving object exits from the view afterwards, a moving object image with a route is generated which comprises overlap of the image of the moving object and the route of the moving object, and is displayed in that region 70 together with the image extraction time of the moving object mentioned above.

When a succeeding moving object enters the view afterwards, the same processing is automatically repeated for the succeeding moving object. The moving object image with a route extracted to the succeeding moving object is displayed adjacent to the moving object image with a route previously displayed. Thus, plural moving object images with a route for plural moving objects which sequentially enter the view are automatically displayed as a list. Therefore, the operator can monitor the moving objects very easily. The region 70 scrolls up automatically, when the number of the extracted moving object images with a route exceeds the number of images which can be displayed in the region 70. Therefore, the latest moving object images with a route will always be displayed at the uppermost position. When the operator is to check all the moving object images with a route, the operator only has to operate the scroll buttons 71 and 73 and the scroll bar 72.

(2) Outline of the Processing

Figure 3:
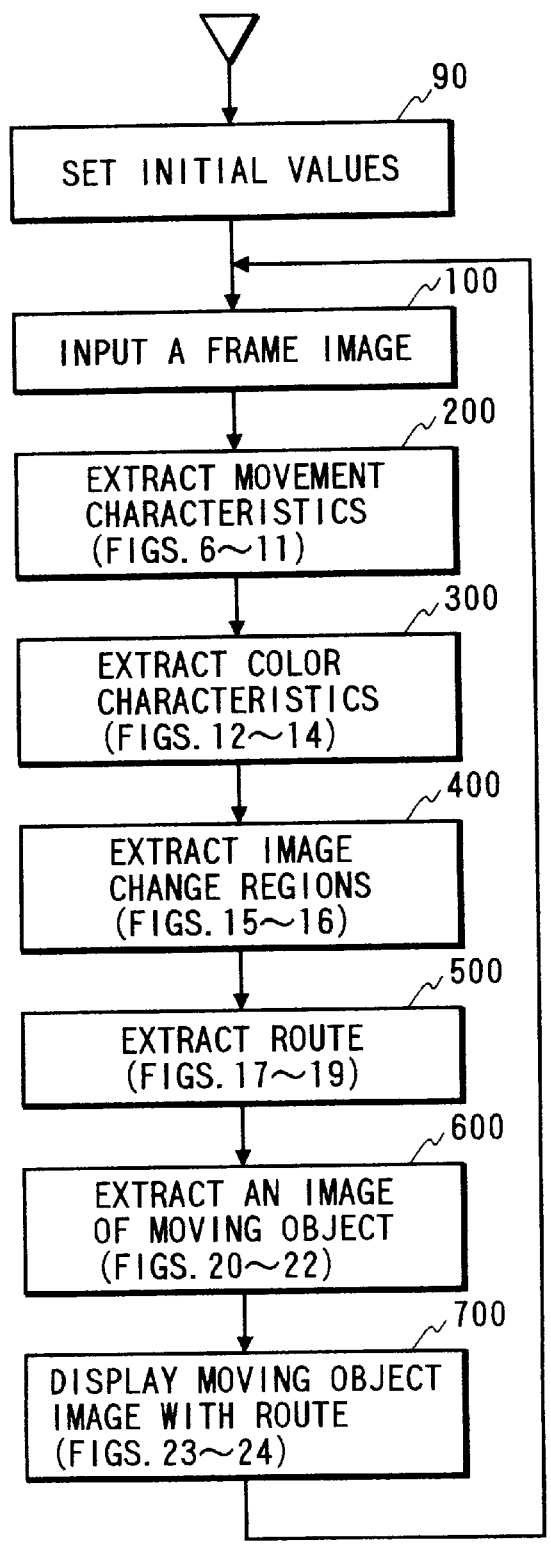
FIG. 3 is a schematic flow chart of the program of display a moving object executed in the apparatus of FIG. 1.

FIG. 3 is an outline flow chart of the program for displaying moving object images with a route as executed in the present system. In FIG. 3, the processing 90 initializes the variables which the program uses. The frame image input processing 100 takes into the memory 5, the digital image data 12 of one frame, as supplied by the video input device 11. The processing 100 and its subsequent processings 200 to 700 are repeated for each frame.

The movement characteristics extraction processing 200 detects, as the movement characteristics of each segmented region, whether at least part of a moving object exists in each segmented region, and extracts plural segmented regions where at least part of the moving object exists, as movement characteristics regions. Concretely, this processing 200 extracts plural time variant edges which exist at positions different from their positions in a preceding frame. The screen is divided into plural segmented regions, and the total number of time variant edge pixels which compose the time variant edges is counted for each segmented region. It is judges whether each segmented region has time variant edge pixels by a number exceeding a predetermined number, in any of the preceding frame and the current frame. When a segmented region fills the judgment condition, the segmented region is extracted as a movement characteristics region. Each movement characteristics region is a segmented region at which at least part of the moving object exists.

The color characteristics extraction processing 300 is one by which the color characteristics is extracted for each segmented region. Concretely, it calculates a histogram of the colors of pixels in the segmented region, and extracts the color whose frequency is the highest in each segmented region, as a representative color of the segmented region. The representative color of each segmented region is used as the color characteristics of the segmented region in the present embodiment.

The image change regions extraction processing 400 extracts plural segmented regions which are expected to include a moving object, from the movement characteristics regions extracted by the processing 200 and the color characteristics extracted by processing 300 for each of the movement characteristics regions. These segmented regions which are expected to include a moving object will be called image change regions.

The route extraction processing 500 extracts one segmented region located at the center of the image change regions extracted by the processing 400, as a passing point of the moving object, and generates image data to paint the extracted one segmented region in a translucent color. The processing 500 is repeated over different frames, whereby other passing points of the same moving object are extracted, and image data is generated, as will be explained later on, to display the segmented regions to which the passing points belong, in a translucent color, in an overlapping manner with the image of the moving object. The image data generated for these passing points composes the route image data used to display the moving route.

The moving object image extraction processing 600 extracts an image of the moving object, when at least part of the moving object passes through a predetermined region in the view, that is, when it passes through a predetermined region in the screen 50. Concretely, the predetermined region in the view is a slender space region in the central part in the view of the camera 9. The corresponding predetermined region in the screen 50 is a slender slit region located at the center of screen 50. The detection of timing when the moving object has passed through the space region is executed by detecting timing when at least part of the plural image change regions extracted by the processing 400 is located in the slit region. In the processing 600, the image which is obtained by reducing the frame image given from camera 9 at this detected timing to ½, for instance, is generated, and is stored as the image of the moving object. Therefore, the images of the moving objects generated thus include the moving objects in the predetermined region in the screen, without depending on their moving routes, so those images are easy to see.

The processing 700 of displaying a moving object image with a route synthesizes the image of the moving object and the route image already generated, when the moving object exits outside the view of the camera 9, and displays it in the region 70 of the display device 1, as the moving object image with a route, and with attached data, for instance, the extraction time of the image of the moving object. When another moving object image with a route for another moving object which entered that view afterwards is displayed in the region 70 of the display device 1, the other moving object image with a route is displayed adjacent to the moving object image with a route already displayed.

In the extraction of the image change regions by the processing 400, the movement characteristics and the color characteristics judged for each segmented region are used, so as not to extract a segmented region which contains a moving object like swinging leaves as an image change region.

Moreover, in the extraction of the image change regions, the passing points of the route already judged with the same moving object are considered, in addition to the movement characteristics and the color characteristics judged for each segmented region, and a segmented region where a person seems to stay is extracted as an image change region.

In addition, when a certain segmented region is judged as passing points of a moving object over plural frames in the processing 500, the route image data which will darken the translucent color of that segmented region is generated therefor. Therefore, a time factor of the movement of the moving object including whether it has stayed at the same position can be known from the route image.

Moreover, the moving object images with a route are reduced images, and pairs of a moving object image with a route and the extraction time are displayed as still images in a form of a list. So, the search of an image of a moving object becomes easy.

(3) Data

FIG. 4 shows a list of the program and the data stored in the memory 5. In the drawing, the program 5-1 is the program for displaying the moving object images with a route whose flow chart was shown in FIG. 3. The reference numeral 5-2 to 5-23 indicate data which the program 5-1 generates or refers to. Among them, 5-2 is data which the program 5-1 generates, 5-3 and 5-4 are parameters which should be set beforehand and 5-5 to 5-23 are work data which the program 5-1 uses in the processing of the image of one frame.

Figure 5:
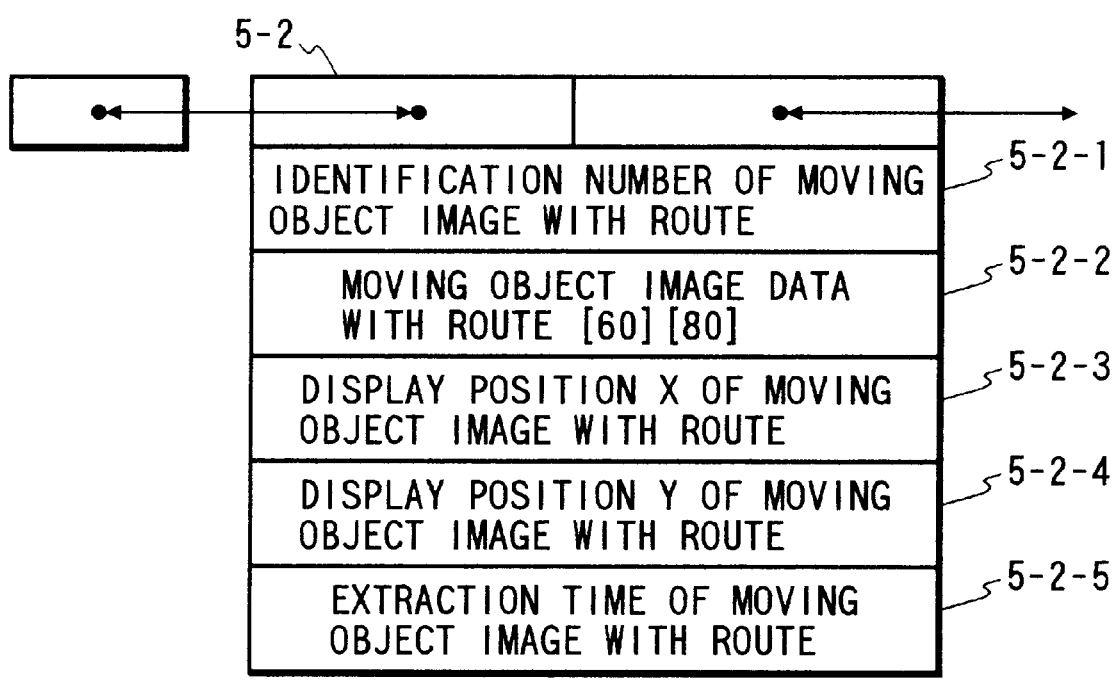
FIG. 5 is a diagram indicative of the format of the data structure of a moving object image with a route, among the data shown in FIG. 2.
Figure 6:
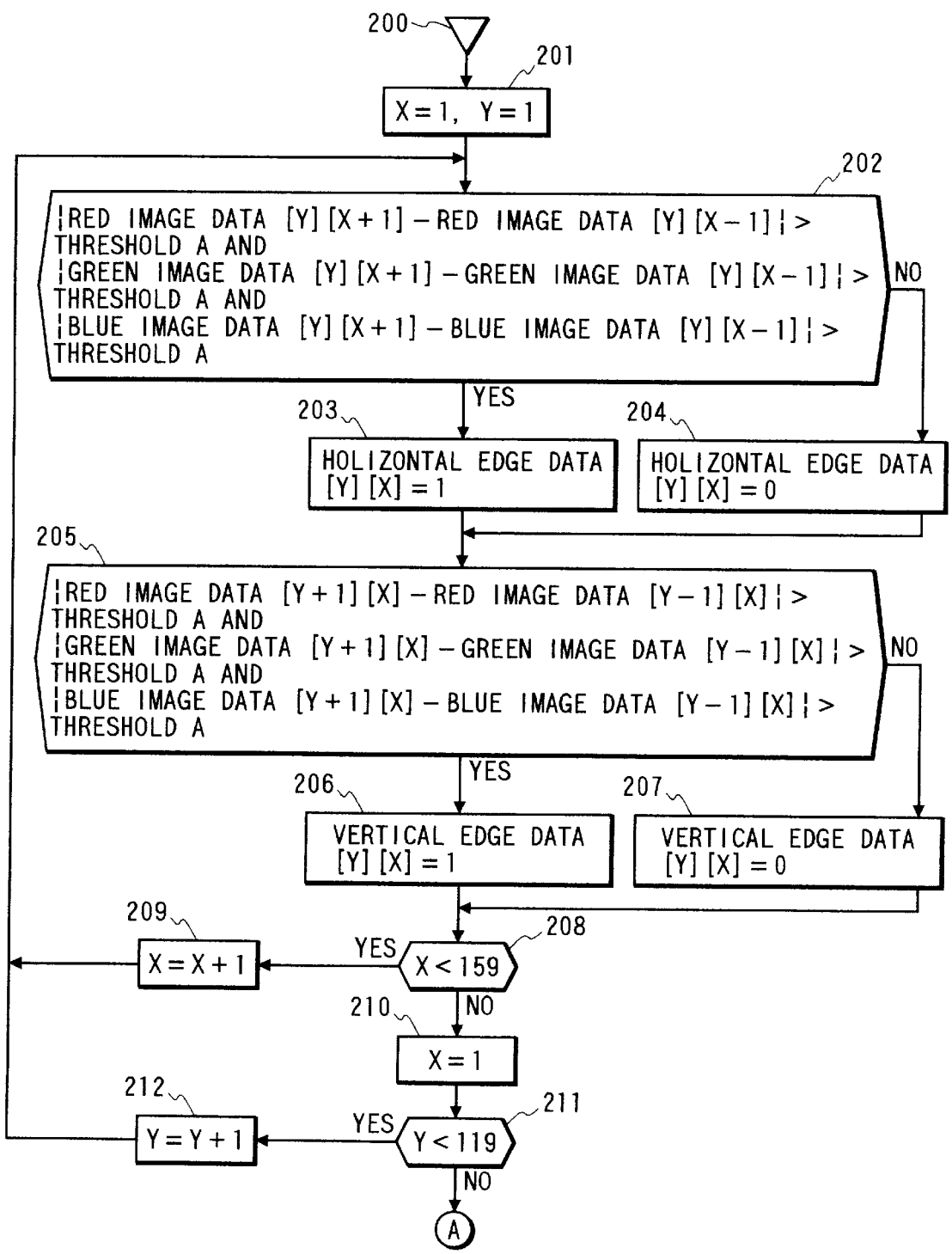
FIG. 6 is a flow chart of part of the movement characteristics extraction processing (200) in the flow chart of FIG. 3.
Figure 7:
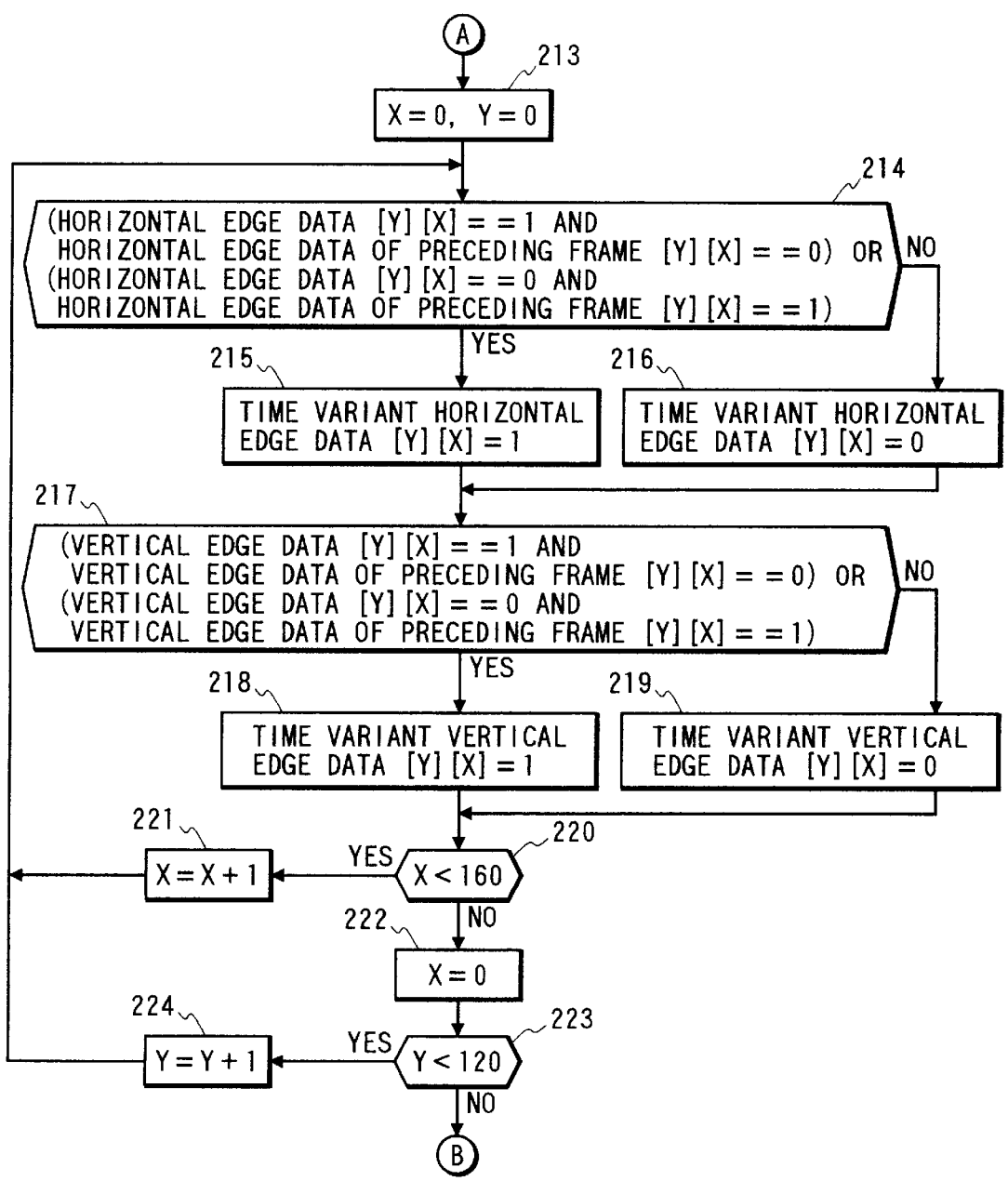
FIG. 7 is a flow chart of another part of the movement characteristics extraction processing (200) in the flow chart of FIG. 3.
Figure 8:
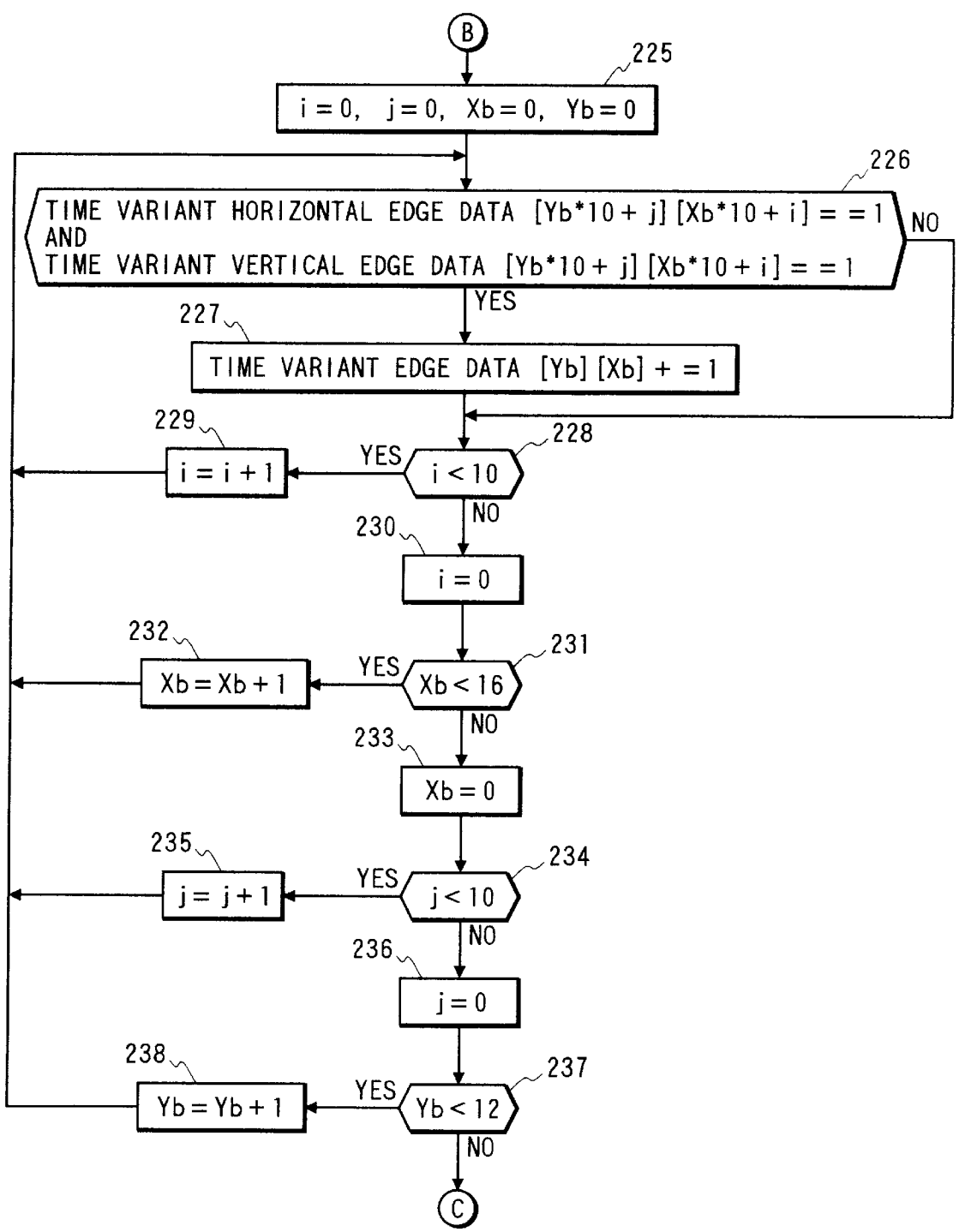
FIG. 8 is a flow chart of a further other part of the movement characteristics extraction processing (200) in the flow chart of FIG. 3.
Figure 9:
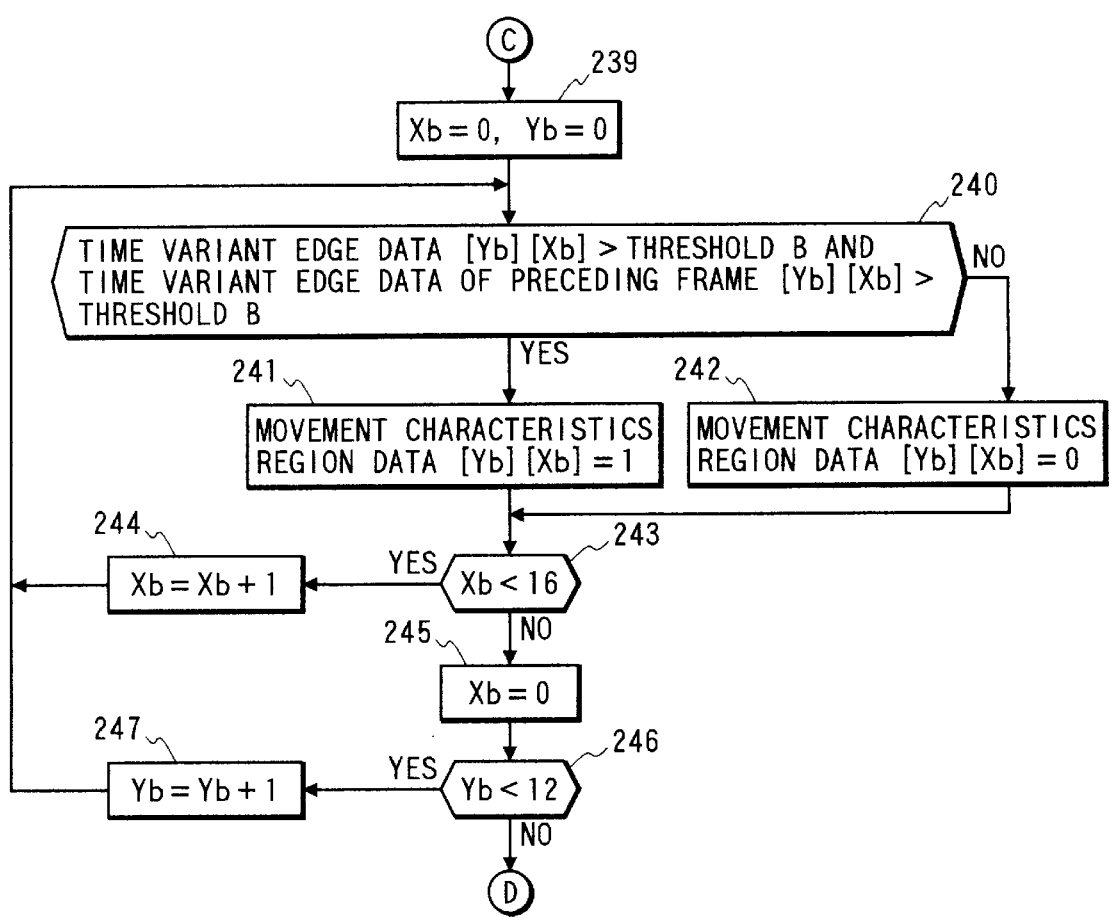
FIG. 9 is a flow chart of a still further other part of the flow chart of the movement characteristics extraction processing (200) in the flow chart of FIG. 3.
Figure 10:
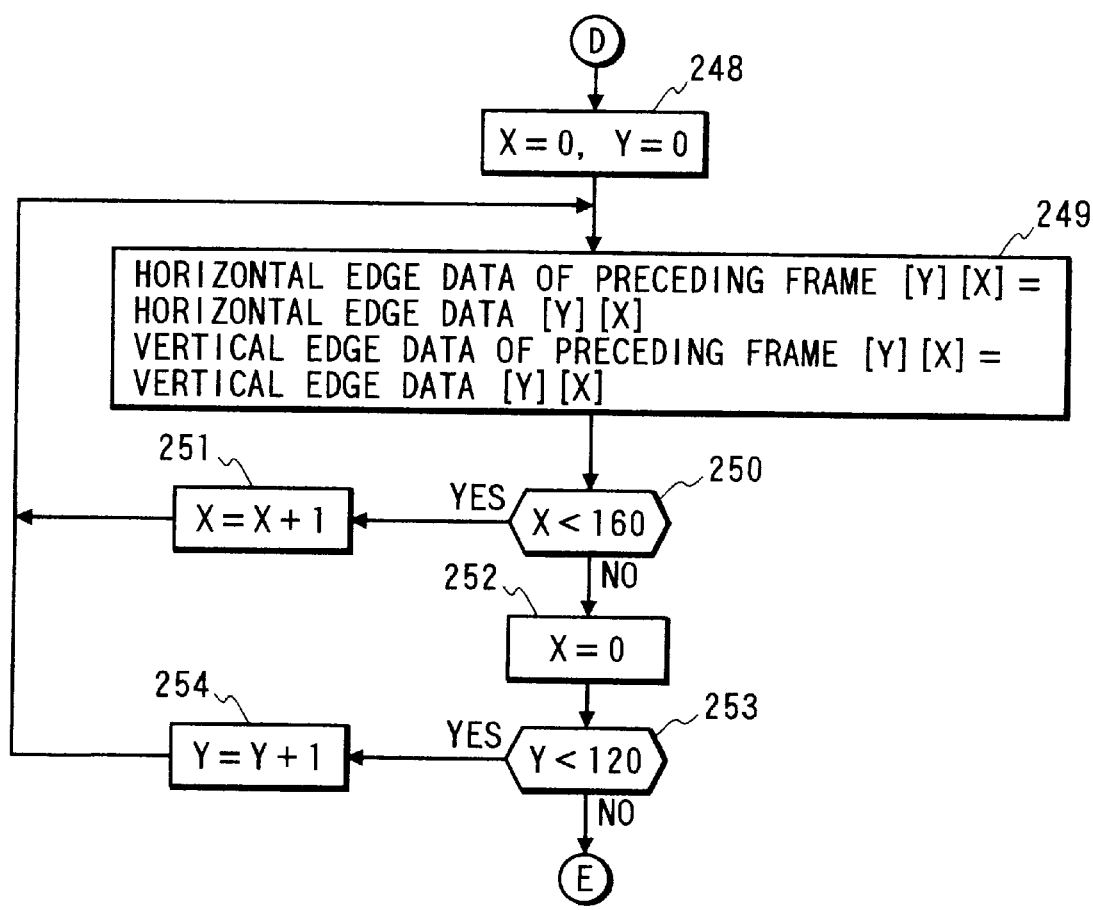
FIG. 10 is a flow chart of a still further other part of the movement characteristics extraction processing (200) in the flow chart of FIG. 3.
Figure 11:
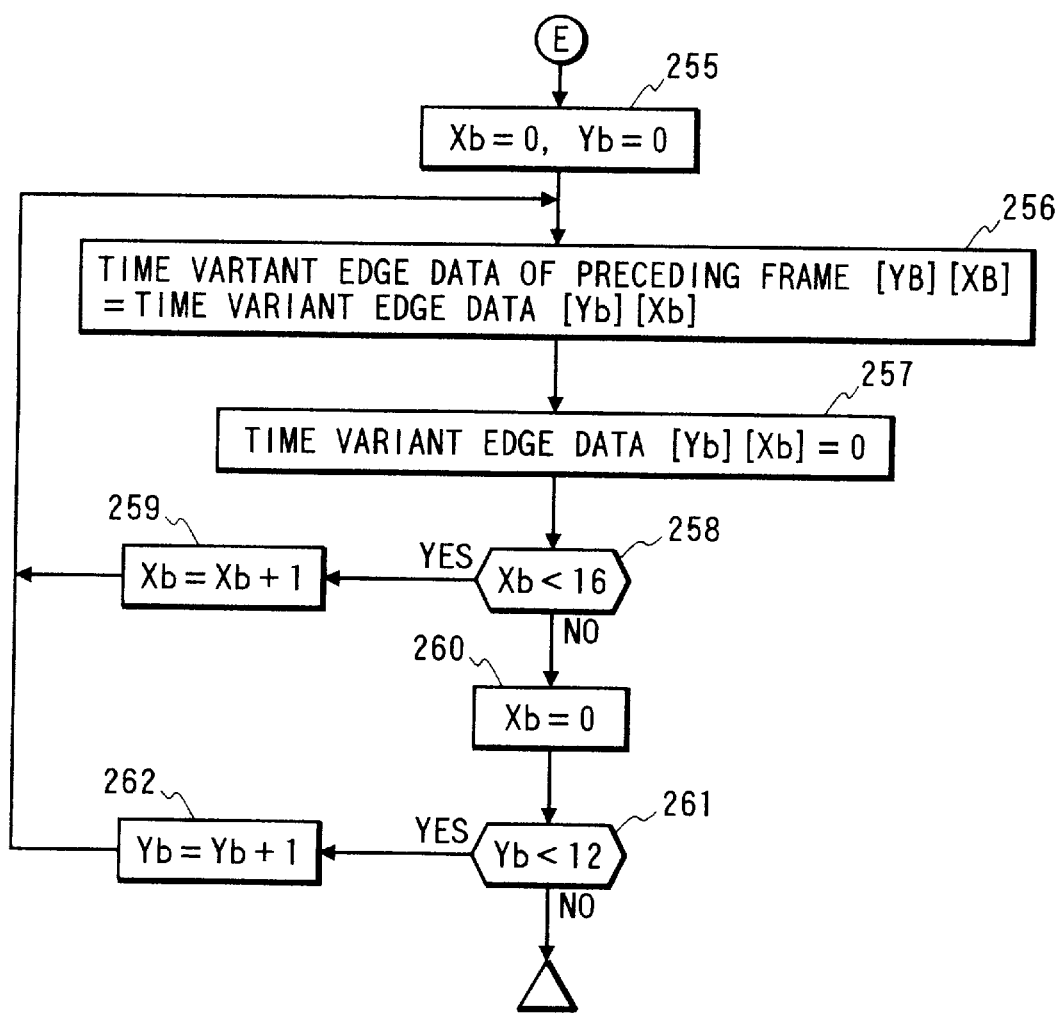
FIG. 11 is a flow chart of a still further other part of the movement characteristics extraction processing (200) in the flow chart of FIG. 3.
Figure 12:
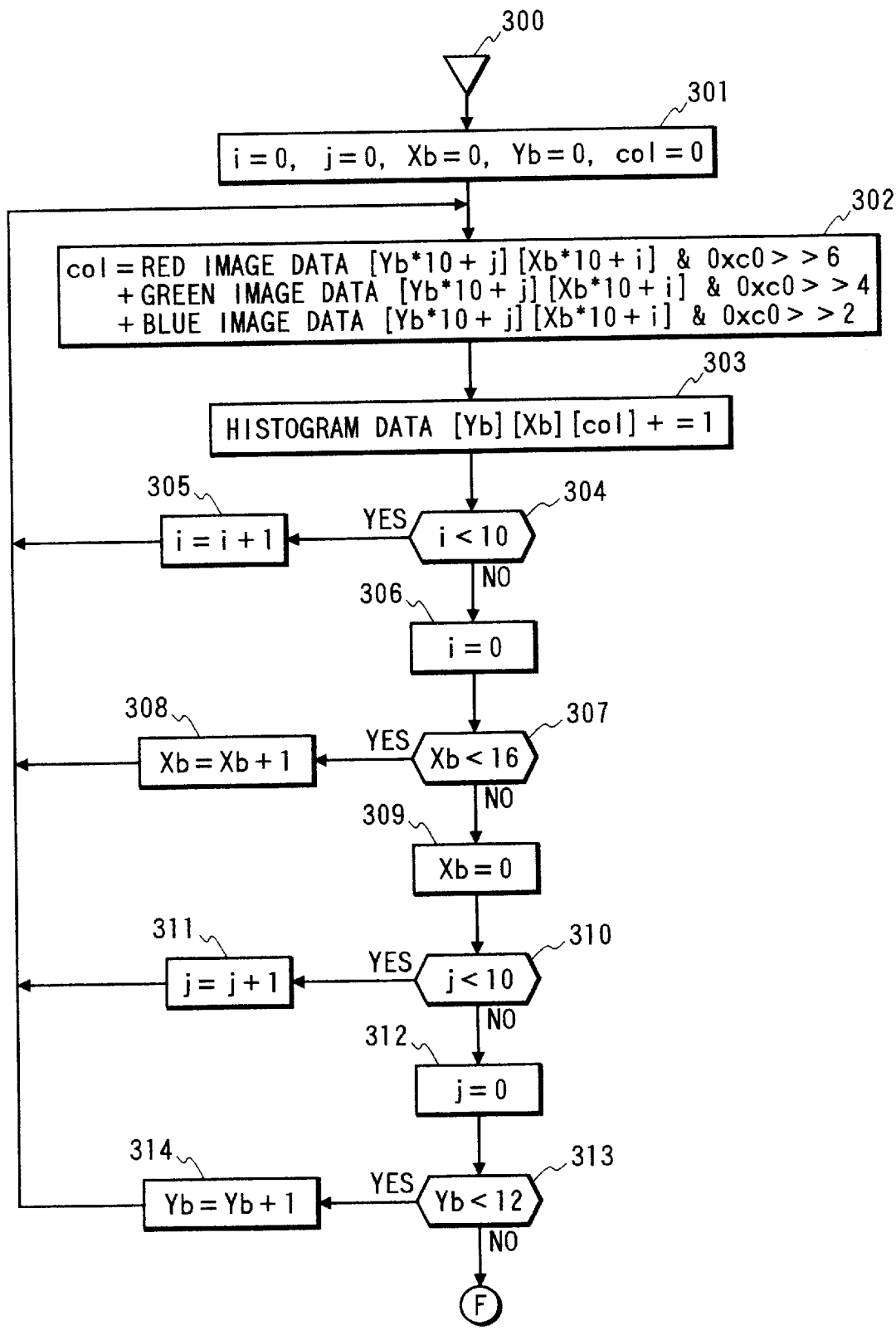
FIG. 12 is a flow chart of part of the color characteristics extraction processing (300) in the flow chart of FIG. 3.
Figure 13:
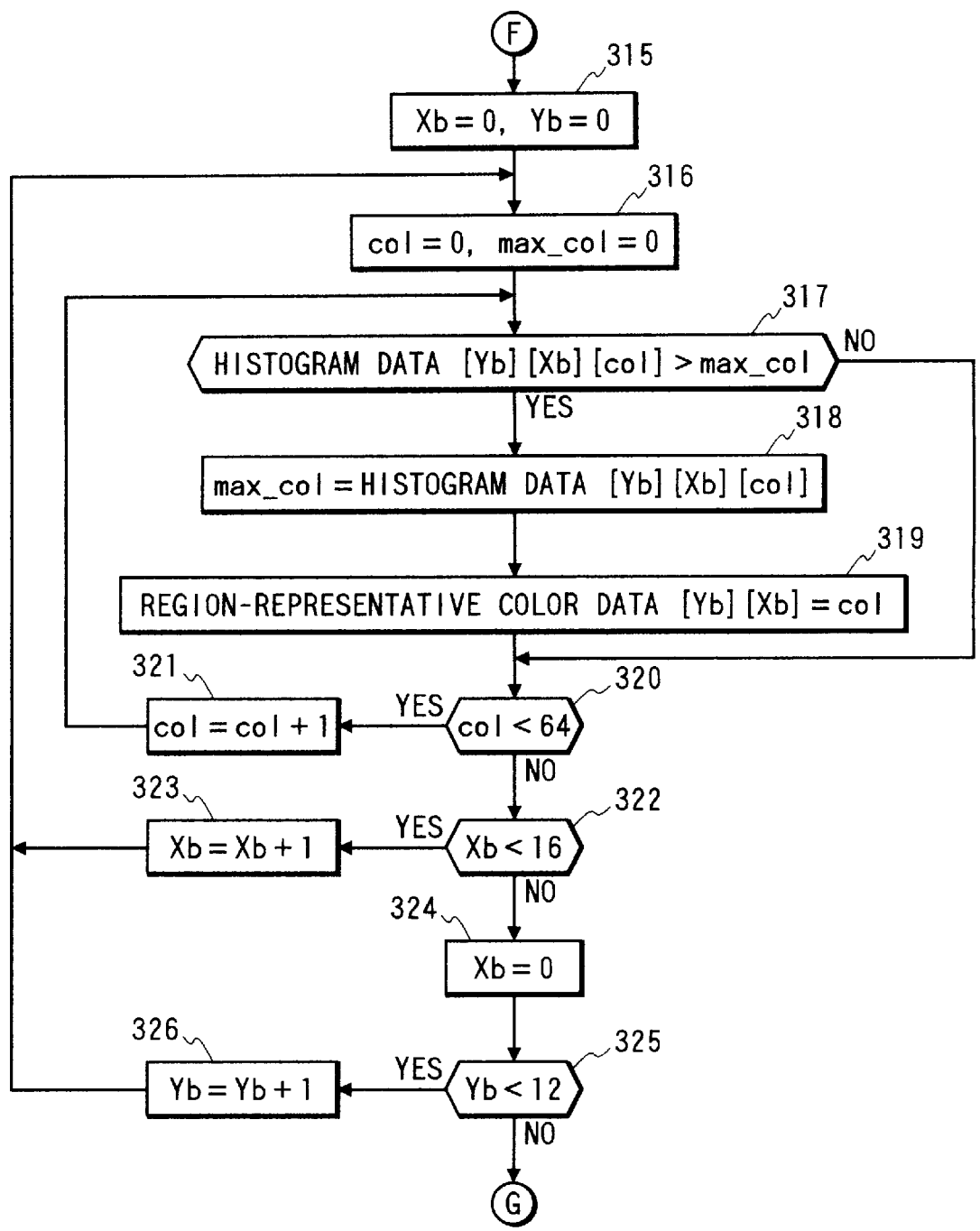
FIG. 13 is a flow chart of another part of the color characteristics extraction processing (300) in the flow chart of FIG. 3.
Figure 14:
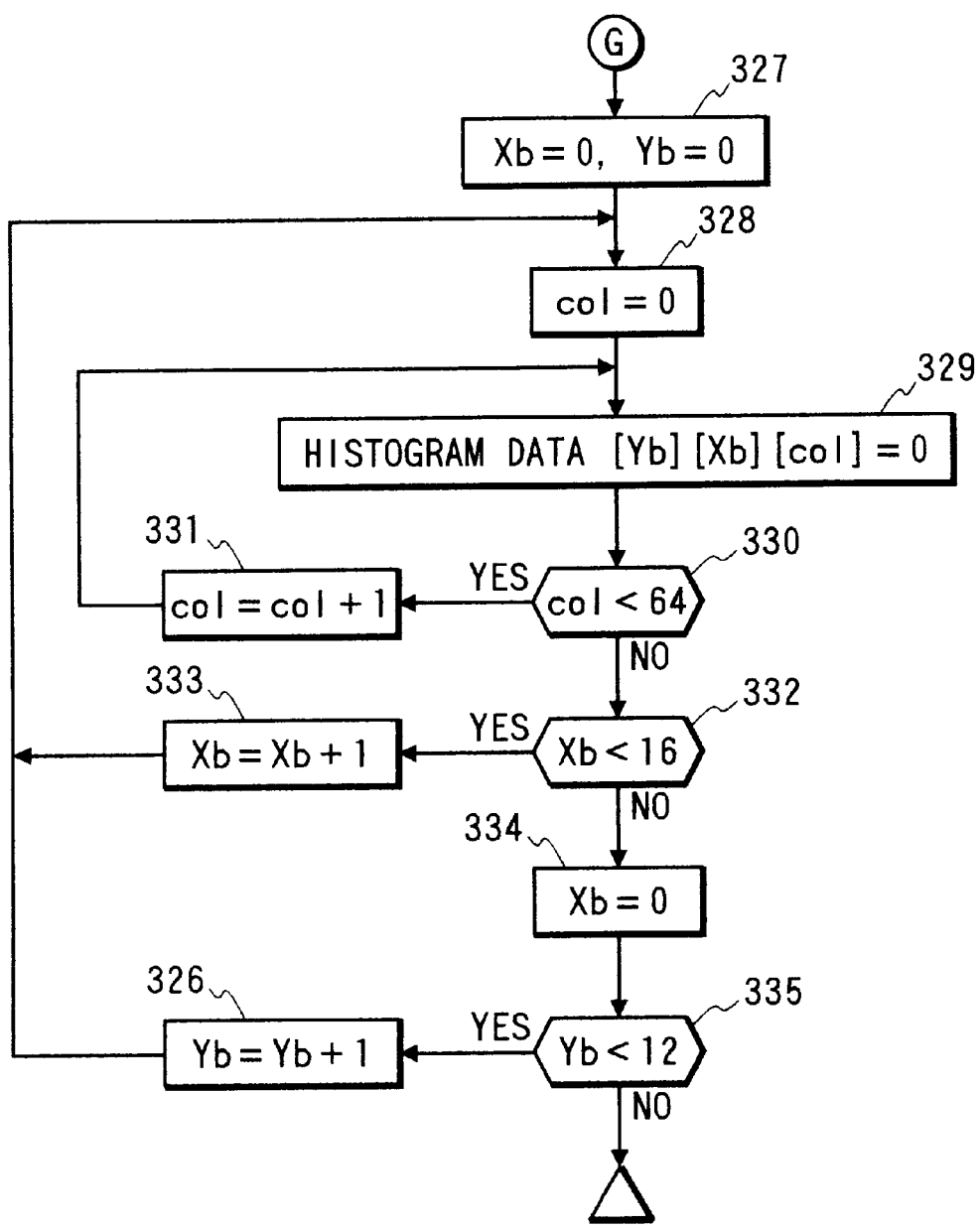
FIG. 14 is a flow chart of a further other part of the color characteristics extraction processing (300) in the flow chart of FIG. 3.
Figure 15:
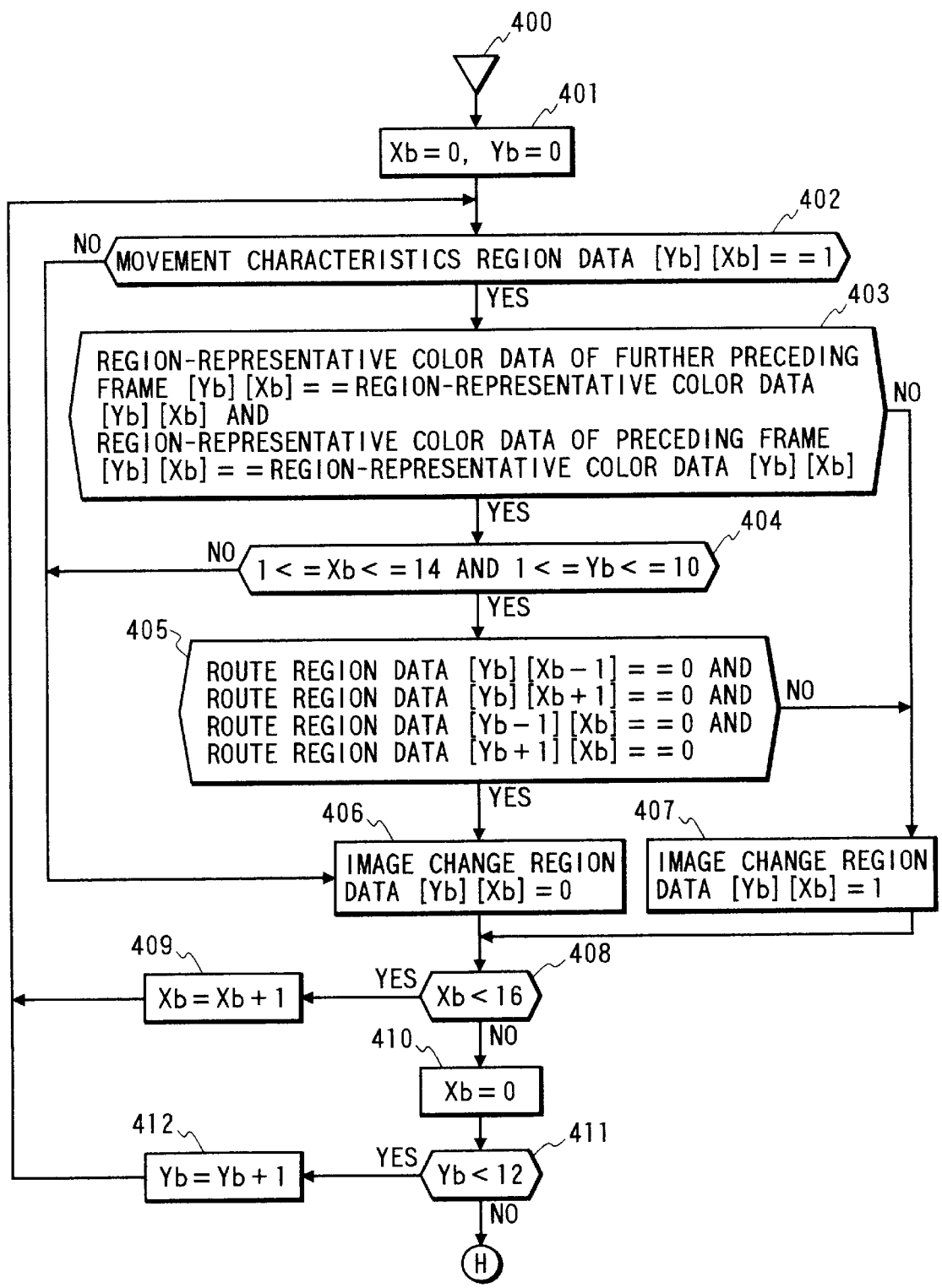
FIG. 15 is a flow chart of part of the image change regions extraction processing (400) in the flow chart of FIG. 3.
Figure 16:
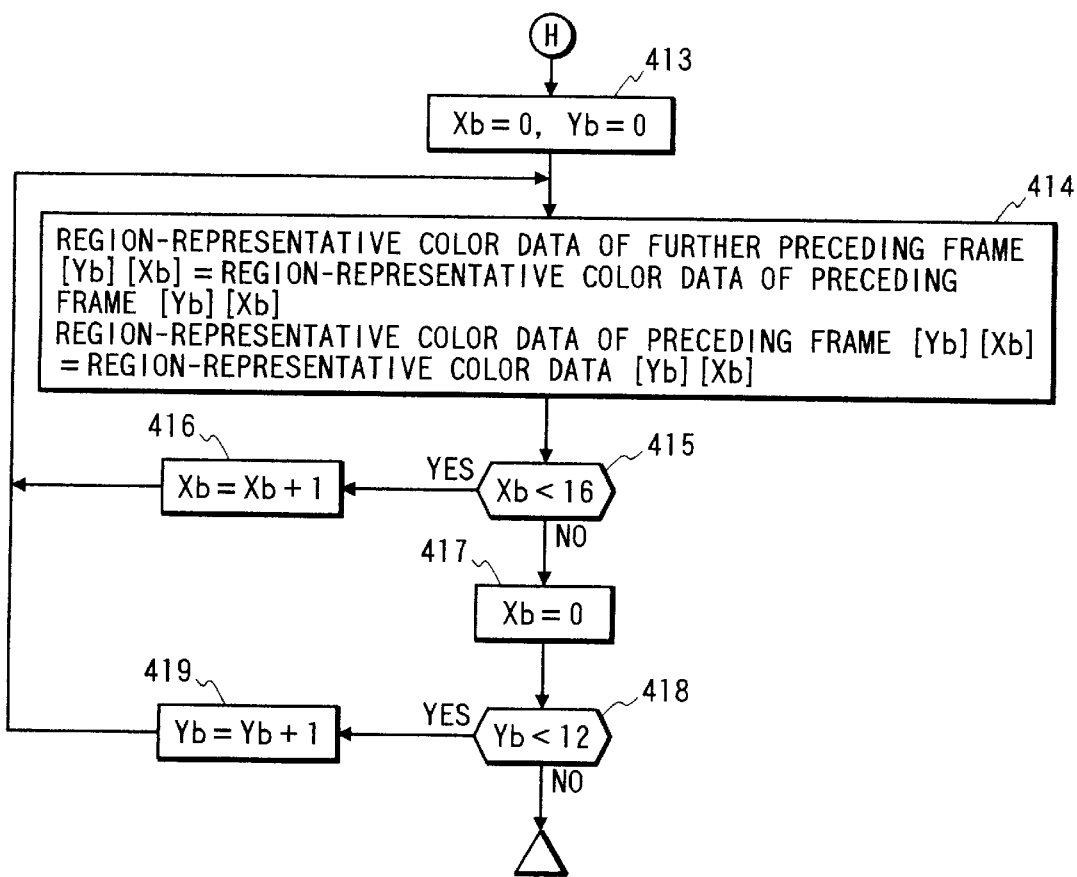
FIG. 16 is a flow chart of another part of the image change regions extraction processing (400) in the flow chart of FIG. 3.
Figure 17:
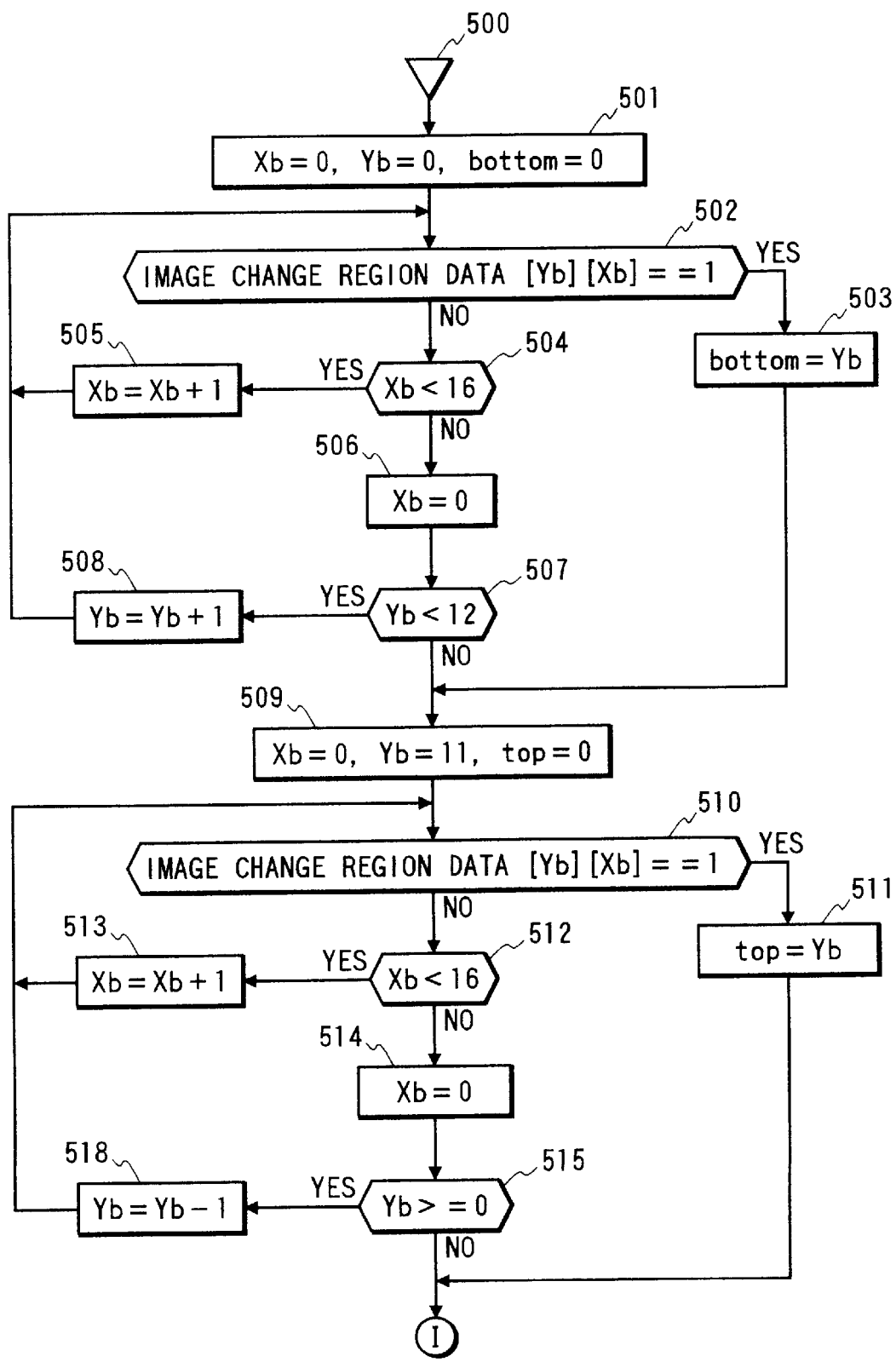
FIG. 17 is a flow chart of part of the route extraction processing (500) in the flow chart of FIG. 3.
Figure 18:
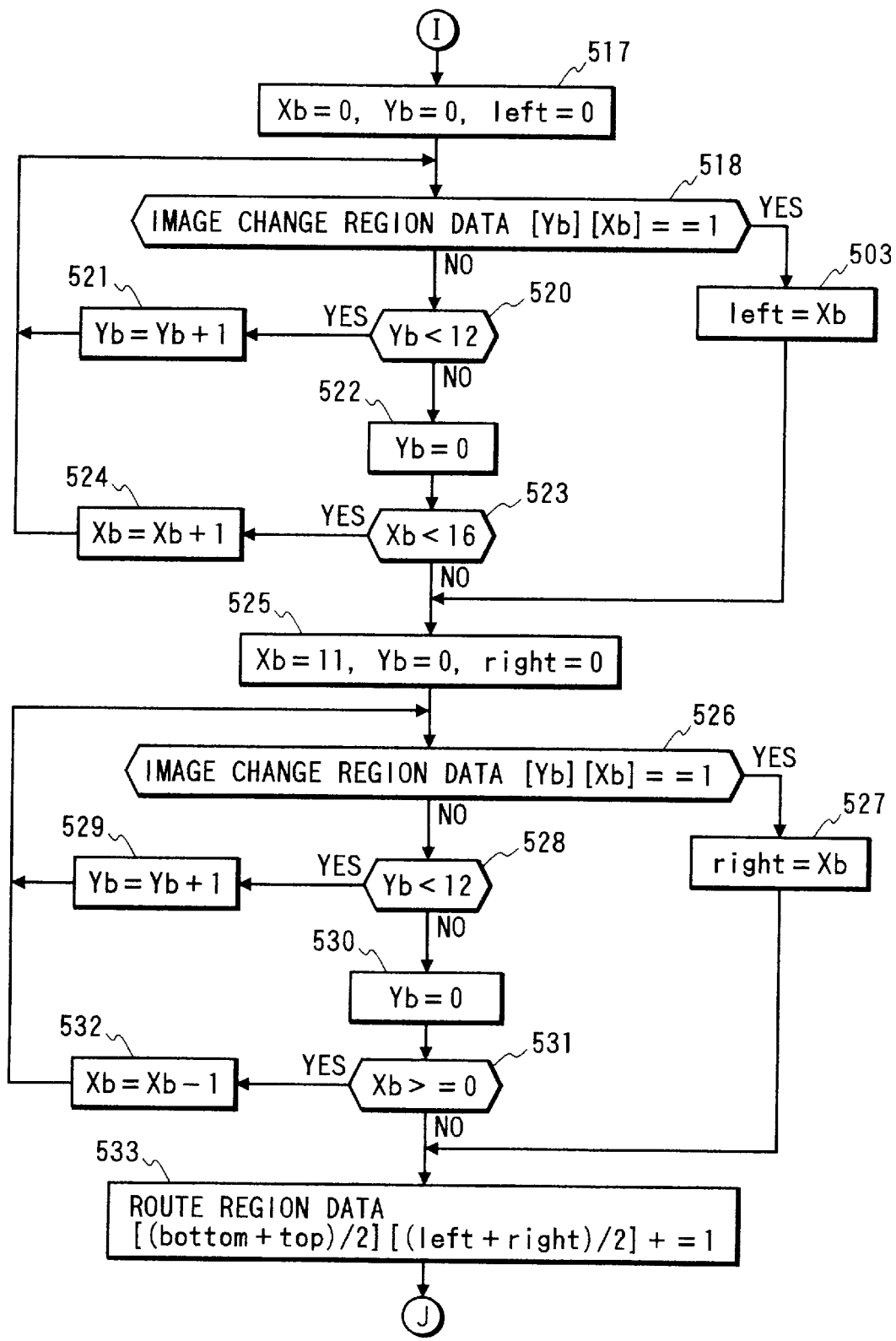
FIG. 18 is a flow chart of another part of the route extraction processing (500) in the flow chart of FIG. 3.
Figure 19:
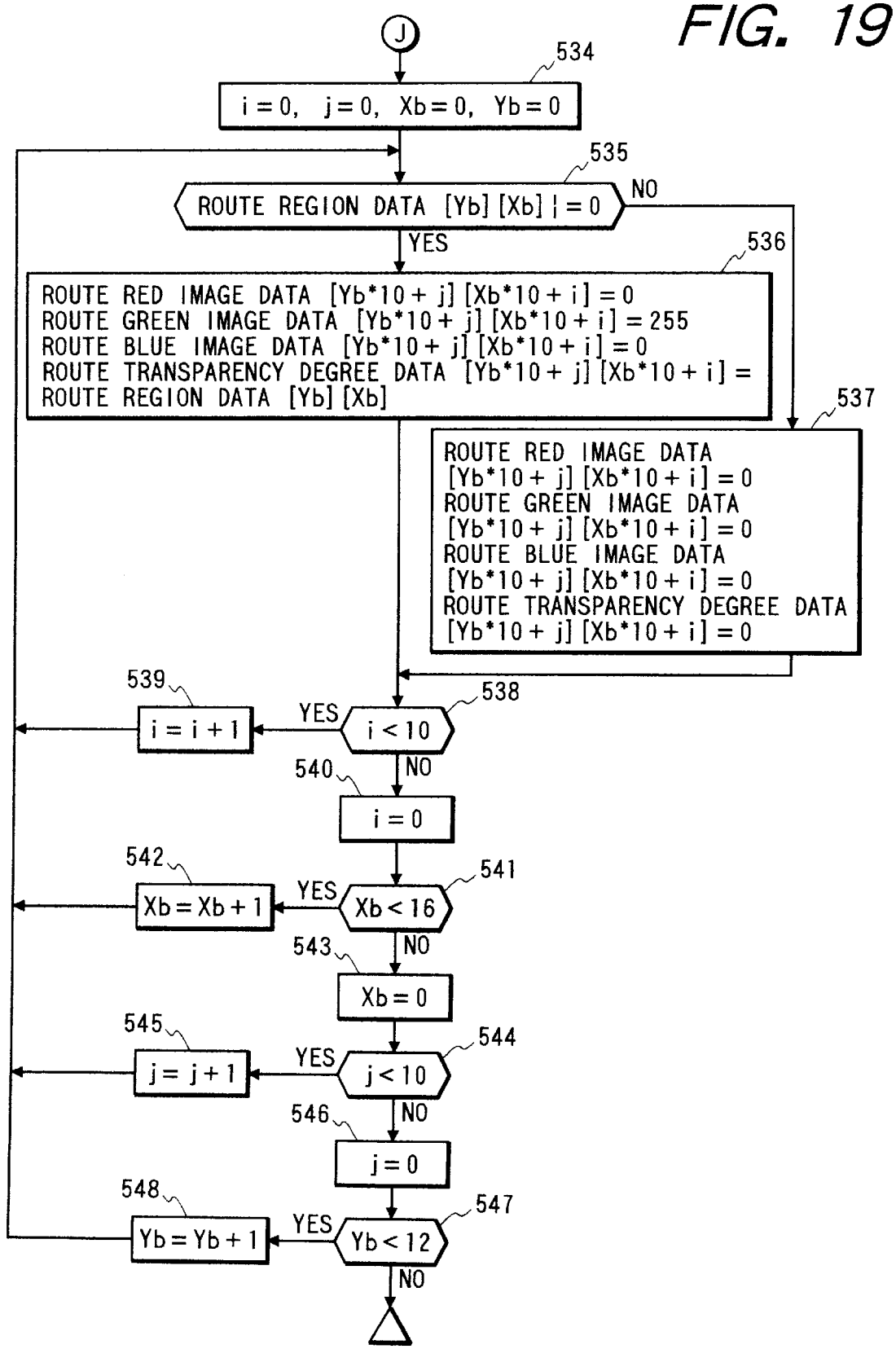
FIG. 19 is a flow chart of a further other part of the route extraction processing (500) in the flow chart of FIG. 3.
Figure 20:
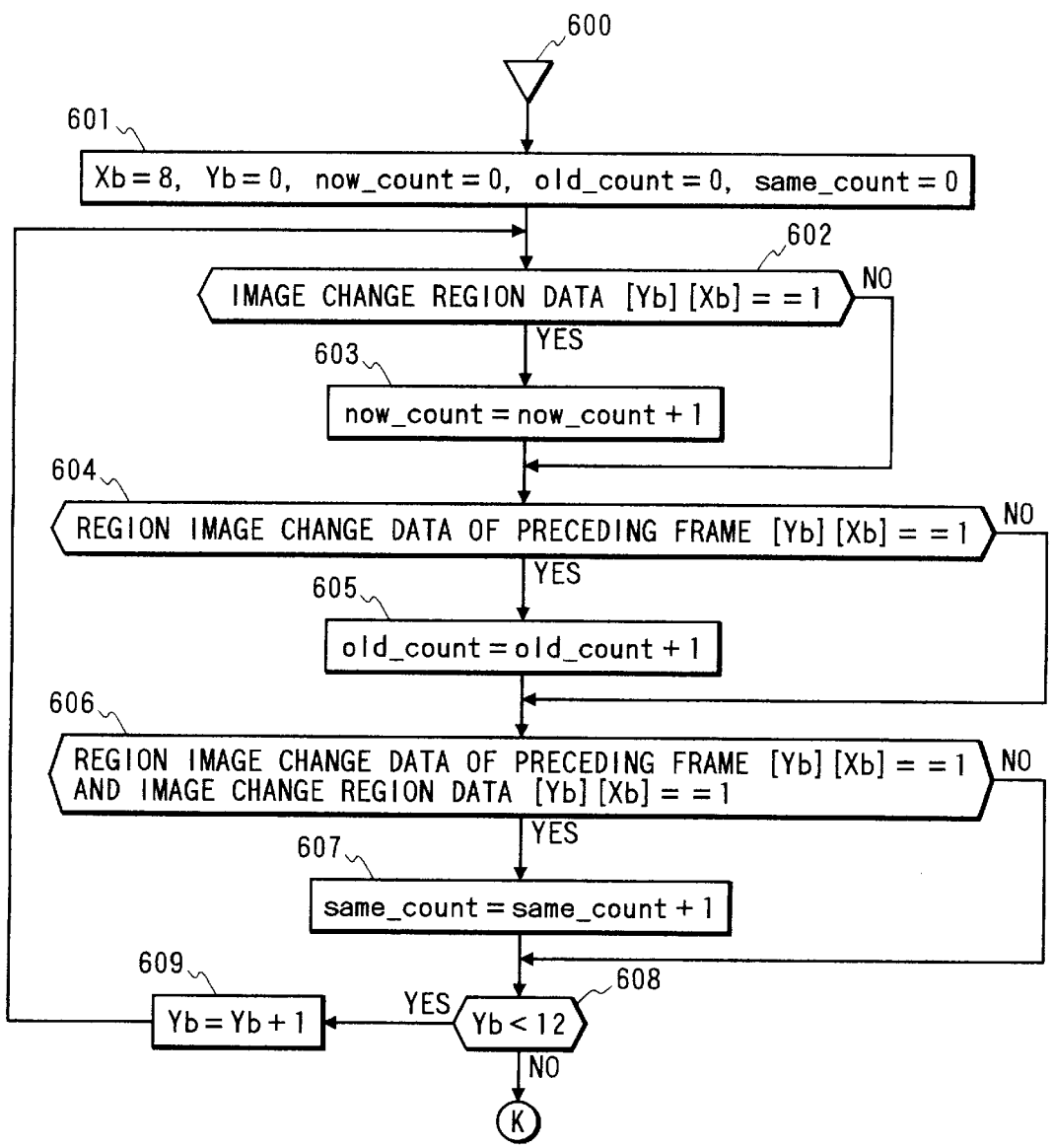
FIG. 20 is a flow chart of part of the moving object image extraction processing (600) in the flow chart of FIG. 3.
Figure 21:
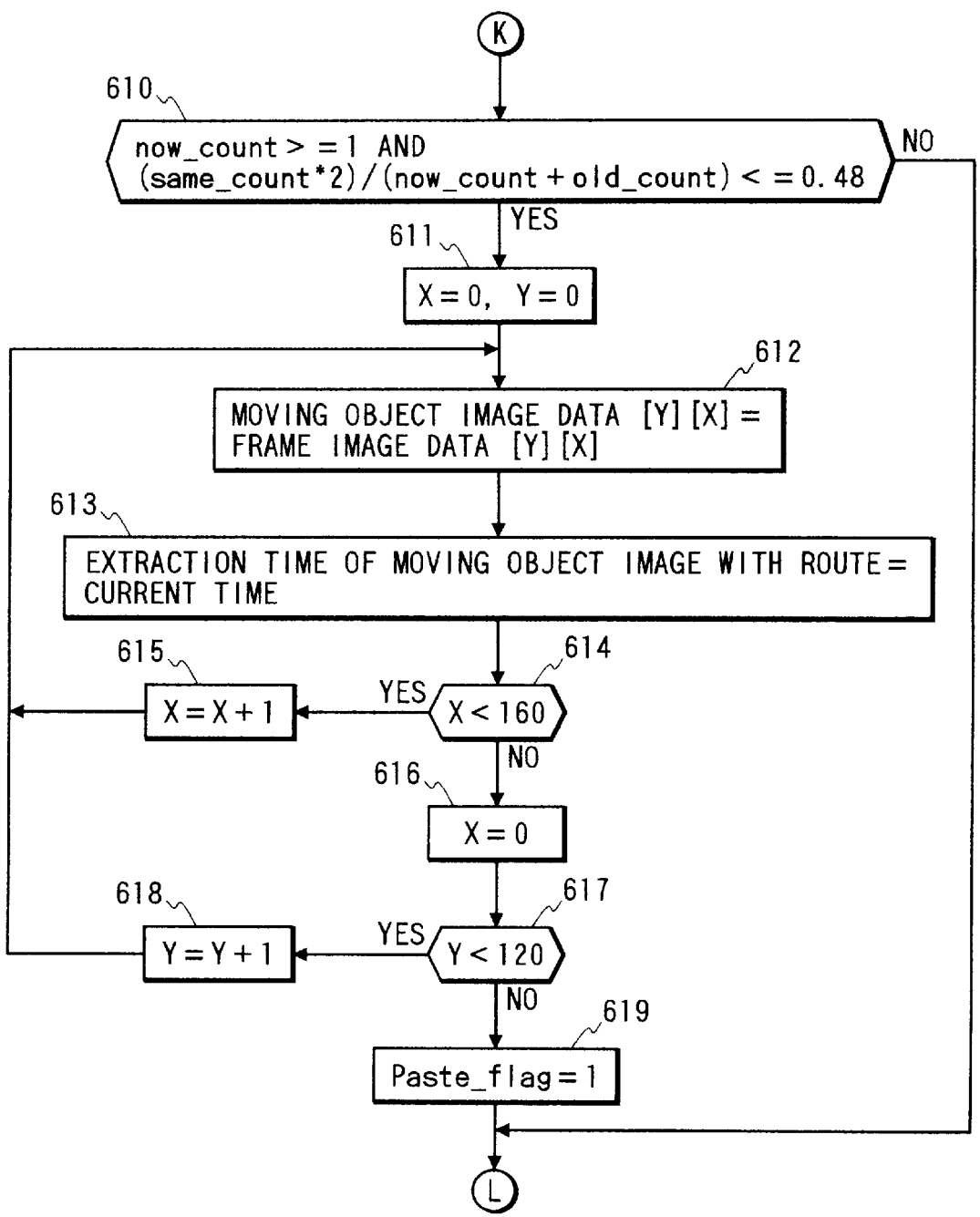
FIG. 21 is a flow chart of another part of the moving object image extraction processing (600) in the flow chart of FIG. 3.
Figure 22:
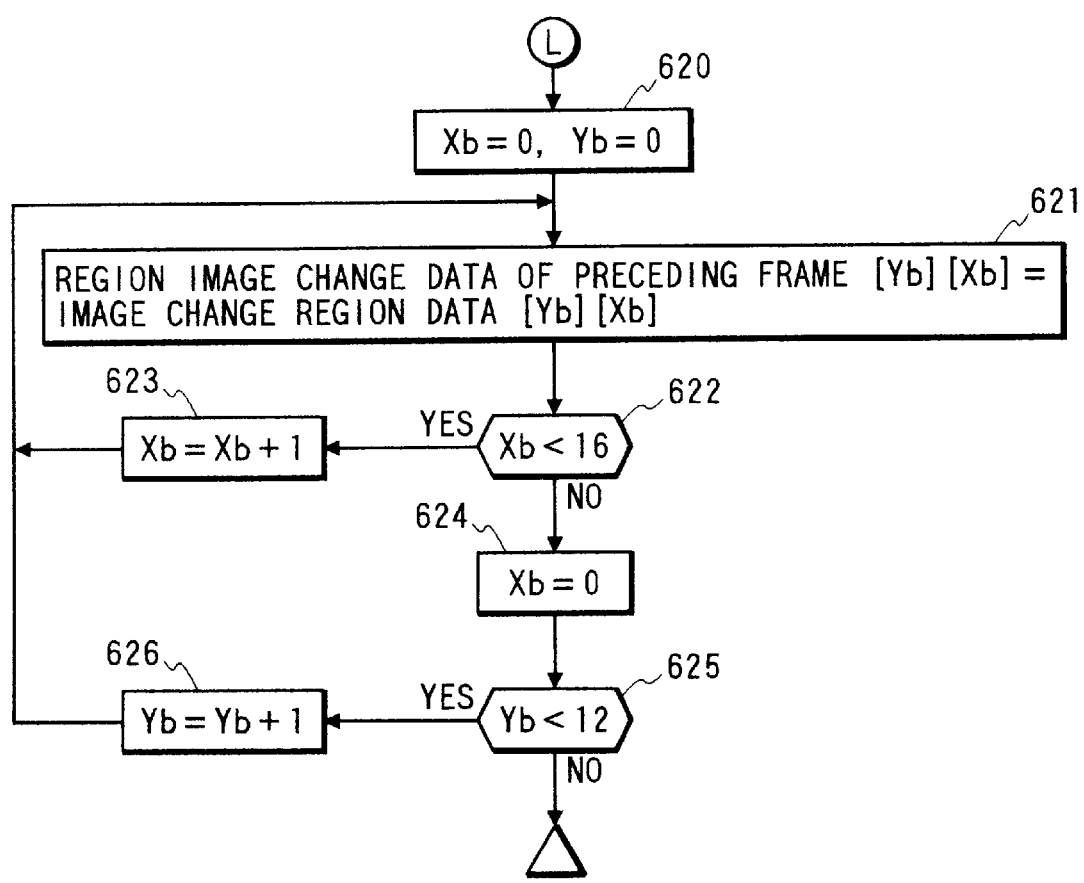
FIG. 22 is a flow chart of a further other part of the moving object image extraction processing (600) in the flow chart of FIG. 3.
Figure 23:
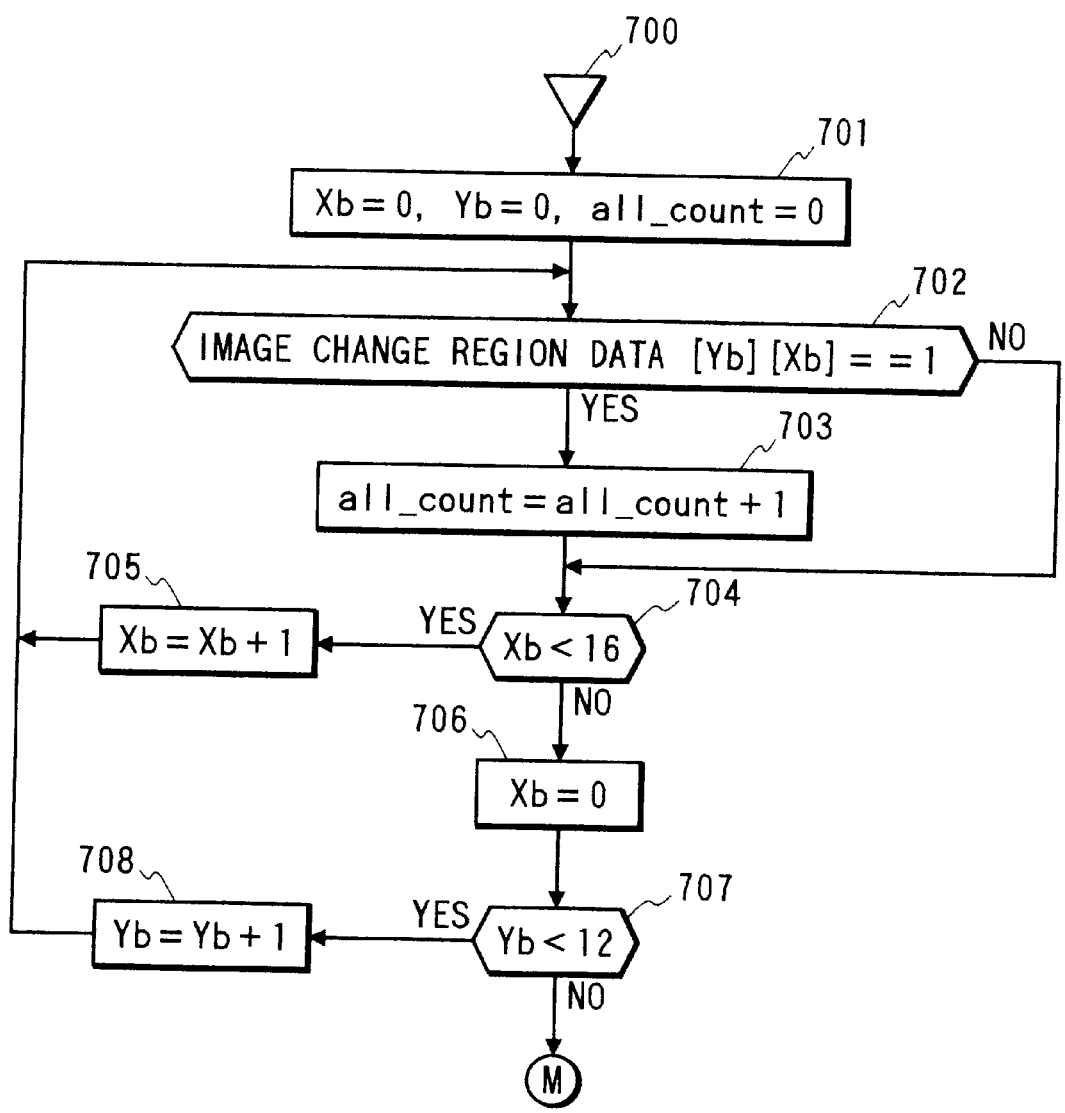
FIG. 23 is a flow chart of part of the processing of displaying a moving object image with a route (700) in the flow chart of FIG. 3.

The data structure 5-2 of a moving object image with a route is one which stores an extracted moving object image with a route and its attached data like time. FIG. 5 shows its details. The first threshold value 5-3 is one used when strong edge pixels of an image are extracted. The second threshold value 5-4 is one used to detect movement characteristics regions.

The data produced by the frame image input processing 100 will be explained first. The frame image data 5-5 is digital image data of the recent frame given by the video input device 11. It comprises three array data named as red image data 5-5-1, green image data 5-5-2, and blue image data 5-5-3 corresponding to three color components data. Each color data comprises data of eight bits which shows one color component of each pixel, and each color component has a value of 0 to 255. It is assumed in the present embodiment that one frame image has 160 pixels located along the horizontal direction (X direction) and 120 pixels located along the vertical direction (Y direction). It is further assumed that one frame image is divided into segmented regions so that 16 segmented regions, for example, are located along the horizontal direction and 12 segmented regions, for example, are located along the vertical direction. Each segmented region comprises 10×10 pixels. Concretely, the red image data [160][120] in the drawing shows that this array data comprises elements which are equal in number to 160×120 pixels in one frame. It is the same with the green image data 5-5-2 and the blue image data 5-5-3. In the following, a pixel will be occasionally called a pixel (X, Y), by using the coordinate X along the horizontal direction (X direction) and the coordinate Y along the vertical direction (Y direction) of the pixel. Moreover, the time variant edge data [16][12] of the reference number 5-12, which will be explained later on, shows that this array data comprises elements which are equal in number to 16×12 segmented regions. Each segmented region may be called a segmented region (X, Y) occasionally in the following, by using its sequential numbers X and Y along the X and Y directions.

Next, various data produced by the movement characteristics extraction processing 200 will be explained. The horizontal edge data 5-6 is array data indicating whether each pixel is one (horizontal edge pixel) which composes a horizontal edge which has a large color difference to its neighboring pixels along the horizontal direction of the image. The vertical edge data 5-7 is array data indicating whether each pixel is one (vertical edge pixel) which composes a vertical edge which has a large color difference to its neighboring pixels along the vertical direction of the image. The horizontal edge data of the preceding frame 5-8 and the vertical edge data of the preceding frame 5-9 are array data which respectively store the horizontal edge data 5-6 and the vertical edge data 5-7 for the frame preceding to the current frame by one frame.

The horizontal edge data 5-10 is array data which indicates whether each pixel is one (time variant horizontal edge pixel) which composes a time variant horizontal edge which exists at different positions between the current frame and the frame preceding thereto by one frame. Similarly, the vertical edge data 5-11 is array data which indicates whether each pixel is one (time variant vertical edge pixel) which composes a time variant vertical edge which exists at different positions between the current frame and the frame preceding thereto by one frame.

The time variant edge data 5-12 is array data which stores for each segmented region, a total number of time variant horizontal edge pixels and time variant vertical edge pixels included in the segmented region. The time variant edge data of the preceding frame 5-13 is array data which stores the time variant edge data 5-12 for the frame preceding to the current frame by one frame. The movement characteristics region data 5-14 is array data which indicates whether each segmented region includes pixels (time variant edge pixels) which composes edges whose positions change with time. Concretely, this array data has a valve of one which shows whether both the total number of the time variant edge pixels of the current frame and the total number of the time variant edge pixels of the frame preceding thereto by one frame exceeds the second threshold value 5-4. In the embodiment, the result of the judgment concerning each segmented region is used as a movement characteristics of the segmented region. When a segmented region fulfills this judgment condition, that region may be occasionally called as a movement characteristics region.

Next, data will be explained which will be produced by the color characteristics extraction processing 300, the image change regions extraction processing 400, the route extraction processing 500, the moving object image extraction processing 600 and the processing 700 of displaying a moving object image with a route. The histogram data 5-15 is array data of three dimensions which indicates for each segmented region, frequency distribution of colors of pixels included in the segmented region. In order to make the histogram data 5-15, the color of each pixel is converted to 64 steps. For each step, a total number of pixels having colors of the step is calculated for each segmented region. The region-representative color data 5-16 is array data which stores the color number of a color step displayed most frequently for each segmented region, that is, a representative color. In the present embodiment, the representative color of each segmented region is used as an example of the color characteristics of the segmented region. The region-representative color data of the preceding frame 5-17 is array data which stores the region-representative color data 5-16 for the frame preceding to the current frame by one frame. The region-representative color data of the further preceding frame 5-17 is array data which stores the region-representative color data 5-16 for the frame preceding to the current frame by two frames.

The image change regions data 5-19 is array data which indicates for each segmented region, whether the segmented region includes pixels (time variant pixels) which composes edges of the image of a moving object. Concretely, this judgment is done based on the movement characteristics and the color characteristics judged for each segmented region. The image change regions data of the preceding frame 5-20 is array data which stores the image change regions data 5-19 for the frame preceding to the current frame by one frame.

The route region data 5-21 is array data which indicates whether each segmented region is a passing point of a moving object. When a segmented region is a passing point of a moving object, the more frequently the segmented region has been judged as one including the moving object, the larger numerical value is stored in the element corresponding to the segmented region in the route region data 5-21. The route image data 5-22 is data which indicates such an image comprised of segmented regions which compose a route along which a moving object has passed, as painted in a specific translucent color. The data comprises the image data for three colors named the route red image data 5-22-1, the route green image data 5-22-2, and the route blue image data 5-22-3, and the route transparency degree data 5-22-4. The route transparency degree data 5-22-4 is data which designates the density of the translucent color used to display the route image. The moving object image data 5-23 is data which shows the image of the moving object. It comprises the red image data 5-23-1, the green image data 5-23-2, and the blue image data 5-23-3.

FIG. 5 shows data structure of a moving object image with a route which includes data of a moving object image with a route and information attached thereto. The identification number 5-2-1 of a moving object image with a route is a serial number of a moving object image with a route. The data of a moving object image with a route 5-2-2 is array data which stores a moving object image with a route. The display position X of a moving object image with a route (5-2-3), and the display position Y of a moving object image with a route (5-2-4) are X and Y coordinate positions where the moving object image with a route is to be displayed in the region 70 (FIG. 2) of the display device 1. The extraction time 5-2-5 of the image of a moving object stores the time when a moving object has entered a predetermined region in the view of the camera 1 or a predetermined region in the screen 50 corresponding thereto.

(4) Details of the Processing

Hereafter, the processing of the program for displaying the moving object image with a route shown in FIG. 3 will be explained in detail, by referring to the data of FIG. 4 and the flow charts shown in FIGS. 6 to 24. These flow charts are described by using the C language.

(4a) Movement Characteristics Extraction Processing 200

The processings 201 to 212 (FIG. 6) are ones which extract pixels of vertical strong edges or horizontal strong edges. The vertical or horizontal edges are ones which can be detected when the image is scanned respectively along the longitudinal direction (vertical direction) or along the lateral direction (horizontal direction). The strong edges are clearer edges in the image. They are edges which represent the outlines of a person such as the outlines of a face, hands or legs or so on of a person or the outline of his clothes, and these edges are suitable to detecting movement of a person in the present embodiment. On the other hand, edges representing the outlines of a nose or so in the face of a person are not suitable to the detection of the movement of the person. In general, these edges are not so distinct as the edges previously described. Therefore, the present embodiment is programmed so as to detect strong edges chiefly.

The processing 201 initializes to 1 the variables X and Y, respectively representing X and Y coordinates of a pixel to be processed. The processing 202 examines whether the color difference between a pair of a pixel (X+1, Y) and a pixel (X−1, Y) which are adjacent to a pixel (X, Y) along the horizontal direction. Concretely, the processing 200 detects whether a pair of elements corresponding to the pair of pixels within each of the red image data 5-7-1, the green image data 5-7-2 and the blue image data 5-7-3 is larger than the first threshold A, based on the image data of one frame supplied by the video input device 11. If the color differences of all color components between the pair of pixels are larger than the first threshold A, the pixel (X, Y) can be regarded as one which composes a horizontal edge in the image. The program moves to the processing 203 in this case, and moves to the processing 204, otherwise.

The processing 203 writes 1 in the element corresponding to the pixel (X, Y) in the horizontal edge data 5-6 and the processing 204 writes 0 in that element. The processings 205 to 207 generate the vertical edge data 5-7 similarly. The processings 208 to 212 form the address update processing to execute the above-mentioned processing to all pixels. The program moves to the processing 213 when all the processings are completed. As the first threshold A used to detect edges by the processing 202 and 205, a comparatively large value, for instance, 55 is used in the present embodiment. As a result, strong horizontal edges or strong vertical edges are chiefly detected. All the edges processed in the present embodiment are strong edges, so strong edges will be simply called as edges below.

The processings 213 to 224 (FIG. 7) are ones which extract horizontal edges or vertical edges which appear at different positions among plural frames. These edges will be called occasionally as time variant horizontal edges or time variant vertical edges. Moreover, these edges will be occasionally called as time variant edges together. Moreover, pixels which Compose time variant horizontal edges, time variant vertical edges or time variant edges will be occasionally called as time variant horizontal edge pixels, time variant vertical edge pixels or time variant edge pixels, respectively.

The processing 213 initializes to 0 the variables X and Y respectively representing the X and Y coordinates of a pixel to be processed. The processing 214 detects whether one of an element of the horizontal edge data corresponding to the pixel (X, Y) and another element of the horizontal edge data of the preceding frame corresponding to the pixel (X, Y) is 1, and the other of the two elements is 0. If the pixel (X, Y) satisfies this condition, the pixel is either a horizontal edge pixel in the preceding frame and not in the present frame, or vice versa. Therefore, this pixel is treated as a time variant horizontal edge pixel which represents a time variant horizontal edge which has changed its position between the preceding frame and the current frame. The program moves to processing 215 in this case and to processing 216 otherwise. The processing 215 writes 1 in the element corresponding to the pixel (X, Y) in the time variant horizontal edge data 5-10, and the processing 216 writes 0 in the same element. The processing 217 to 219 generates the time variant vertical edge data 5-11 similarly. The processings 220 to 224 form the address update processing to execute the above-mentioned processing to all pixels. The program moves to the processing 225 when all the processings are completed.

The processings 213 to 224 mentioned above extract edges which appear at different locations between at least two past frames. Because the camera 9 is fixed, the edges of the background are immovable. Therefore, it is possible to remove edges generated by the background, by the detection of above-mentioned time variant horizontal edges or time variant vertical edges. Therefore, it is possible to extract only the edges which derive from the movement of a moving object which has invaded in a monitoring zone.

The processings 225 to 238 (FIG. 8) are ones to count the time variant edge pixels included in each segmented region. The processing 225 initializes to 0 the variables Xb and Yb representing the serial numbers along the X and Y directions assigned to a segmented region to be processed and the variables i and j representing the serial numbers along the X and Y directions assigned to a pixel to be processed within the segmented region. The processing 226 examines whether at least one of an element corresponding to a pixel (i, j) within the segmented region (Xb, Yb) within the time variant horizontal edge data 5-10 and another element corresponding to the same pixel in the time Ad variant vertical edge data 5-11 is 1. If this pixel fulfills this condition, the pixel is treated as a time variant edge pixel in the present embodiment. The program moves to processing 227 in this case, and moves to processing 228 otherwise. The processing 227 adds 1 to the value of the element corresponding to the segmented region (Xb, Yb) in the time variant edge data 5-12. The processings 228 to 238 form the address update processing to execute the above-mentioned processing to all pixels. The program moves to the processing 239 when all processings are completed.

The processings 239 to 247 (FIG. 9) are ones which detect whether each segmented region contains a moving image. The processing 239 initializes to 0 the variables Xb and Yb representing the serial numbers along the X and Y directions assigned to a segmented region to be processed. The processing 240 examines whether the value of the element corresponding to the segmented region (Xb, Yb) in the time variant edge data 5-12 is not less than the second threshold B, and at the same time the value of the element corresponding to the segmented region in the time variant edge data of the preceding frame 5-13 is not less than the second threshold B. If the segmented region fulfills these two conditions, the segmented region is treated as a region including a moving image in the present embodiment, because the segmented region contains time variant edge pixels more than a predetermined number continuously in plural frames. The purpose of checking the values of the elements of the time variant edge data corresponding to the segmented region for plural frames is to remove the influence of noise, etc., generated by the image processing. Whether the segmented region fulfills these conditions is called the movement characteristics of the segmented region. In addition, when the segmented region fulfills these conditions, the segmented region may be called as one having movement characteristics and the segmented region may be called as a movement characteristics region. The program moves to the processing 241 when the segmented region fulfills these two conditions, and to the processing 242 otherwise. The processing 241 writes 1 in the element of the movement characteristics region data 5-14 corresponding to the segmented region and the processing 242 writes 0 in the same element. The processings 243 to 247 form the address update processing to execute the above-mentioned processing to all regions. The program moves to the processing 248 when all processings are completed.

The processings 248 to 254 (FIG. 10) are the update processing of the horizontal edge data of the preceding frame 5-8 and the vertical edge data of the preceding frame 5-9. The processing 248 initializes to 0 the variable X and Y representing the serial numbers along the X and Y directions assigned to a segmented region to be processed. The processing 249 assigns the element corresponding to the segmented region (X, Y) in the horizontal edge data 5-6 into the element corresponding to the segmented region (X, Y) in the horizontal edge data of the preceding frame 5-8, and assigns the element corresponding to the segmented region (X, Y) in the vertical edge data 5-7 into the element corresponding to the segmented region (X, Y) in the vertical edge data of the preceding frame 5-9. The processings 250 to 254 are an address update processing to execute the above-mentioned processing to all pixels.

The processings 255 to 262 (FIG. 11) are ones which update the time variant edge data of the preceding frame 5-13 and zero clears the time variant edge data 5-12. The processing 255 initializes to 0 the variables Xb and Yb representing the serial numbers along the X and Y directions assigned to a segmented region to be processed. The processing 256 assigns the value of the element corresponding to the segmented region (Xb, Yb) in the time variant edge data 5-12 into the element corresponding to the segmented region (Xb, Yb) in the time variant edge data of the preceding frame 5-13. The processing 257 assigns 0 into the element corresponding to the segmented region (Xb, Yb) in the time variant edge data 5-12. The processings 258 to 262 form the address update processing to execute the above-mentioned processing to all the regions.

(4b) Color Characteristics Extraction Processing 300

The processings 301 to 314 (FIG. 12) make a histogram of the colors of 10×10 pixels which belong to each segmented region, as a preprocessing of a processing to obtain a representative color of each segmented region. The processing 301 initializes to 0 the variables Xb and Yb representing the serial numbers along the X and Y directions assigned to a segmented region to be processed, the variables i and j representing the serial numbers along the X and Y directions assigned to a pixel to be processed within the segmented region, and the variable col representing a color number of a representative color. The processing 302 translates the color of an (i, j)-th pixel in the segmented region (X, Y), that is, the pixel (X×10+i, Y×10+j), to one of the colors of 64 steps, and writes the color number in the variable col.

That is, the red image data 5-5-1, the green image data 5-5-2, and the blue image data 5-5-3 of each pixel comprise eight bits. Each color component is represented by 256 steps. In the processing 302, the upper two bits of each of the three elements corresponding to the same pixel in the red image data 5-5-1, the green image data 5-5-2 and the blue image data 5-5-3 are cut out, and the data of which comprises these cut out six bits in total is used as a color number of the pixel. Concretely, in the processing 302, 0xc0 is a hexadecimal representation of the binary data 11000000. The first expression shows that the data obtained by the logical product of the element corresponding to the pixel (X×10+i, Y×10+j) in the red image data 5-5-1 and the binary data 11000000 is shifted to the right by six bits. Similarly, the second expression shows that the data obtained by the logical product of the element corresponding to the pixel (X×10+i, Y×10+j) in the green image data 5-5-2 and data 11000000 is shifted to the right by four bits. The third expression shows that the X4 data obtained by the logical product of the element corresponding to the pixel (X×10+i, Y×10+j) in the blue image data 5-5-3 and the data 11000000 is shifted to the right by two bits. Processing 302 shows that the color number of six bits obtained as a result of the logical addition of the three two-bit data obtained thus is assigned into the variable col.

The histogram data 5-15 is a three-dimensional array data which has 64 elements for each segmented region (X, Y). Processing 303 adds 1 to the element of the color number histogram data 5-15 corresponding to the combination of the segmented region (x, Y) and the value of the variable col calculated by the processing 302. The processings 304 to 314 form the address update processing to execute the above-mentioned processing to all pixels. The program moves to the processing 315 when all processings are completed.

The processings 315 to 326 (FIG. 13) are ones which extract the representative color of each segmented region. The processing 315 initializes to 0 the variables Xb and Yb representing the serial numbers along the X and Y directions assigned to a segmented region to be processed. The processing 316 initializes to 0, the variable color and the variable max_col representing the color number with the maximum appearing frequency for the segmented region under processing, among the color numbers of 64 steps. In order to detect the color number whose frequency of use is the highest in the segmented region (Xb, Yb), the processing 317 examines whether the value of the element (Xb, Yb, col) in the histogram data 5-15 is larger than that of the variable max_col. The program moves to the processing 318, if the former is larger than the latter, and moves to the processing 320, if the former is smaller than the latter. The processing 318 replaces the variable max_col by the value of the element (xb, Yb, col) in the histogram data 5-15 and moves to the processing 319. The processing 319 writes the variable col indicative of the color number into the element (Xb, Yb) in the region-representative color data 5-16. The processings 320 to 321 form the address update processing to execute the above mentioned processing to all 64 steps. The processings 322 to 326 form the address update processing to execute the above-mentioned processing to all regions. Thus, the region-representative color data 5-16 which maintains the color number of the representative color of all segmented regions is generated. When the image change region extraction processing 400 ends, the region-representative color data 5-16 is moved to the region-representative color data of the preceding frame 5-17, as will be explained later with reference to FIG. 16. The region-representative color data of the preceding frame 5-17 at that time is moved to the region-representative color data of the further preceding frame 5-18.

The processings 327 to 336 (FIG. 14) execute zero clearing of the histogram data 5-15. The processing 327 initializes to 0 the variables Xb and Yb representing the serial numbers along the X and Y directions assigned to a segmented region to be processed. The processing 328 initializes to 0 the variable col representing the color number to be processed. The processing 329 writes 0 into the histogram data 5-15, to zero clear it, and the program moves to the processing 330. The processings 330 to 331 form the address update processing to execute the above-mentioned processing to all color numbers for the segmented region (X, Y) in the histogram data 5-15. The processings 332 to 336 form the address update processing to execute the above-mentioned processing to all segmented regions.

(4c) Image Change Regions Extraction Processing 400

The processings 401 to 412 (FIG. 15) are ones which extract regions (image change regions) which can be regarded as ones including an image of a moving object, based upon the movement characteristics and the color characteristics detected for each segmented region. As was already explained, the movement characteristics detected for each segmented region shows whether the segmented region contains time variant edge pixels more than a fixed number. However, some problems occur, if a segmented region judged as a movement characteristics region is used as a region which includes an image of a moving object to be traced. Especially, it occurs that the representative colors of those segmented region does not change over plural frames. Such phenomenon occurs when a segmented region shows swinging of the leaves of trees, and when the segmented region maintains the image of a moving object which seems to be at a standstill. The processings 401 to 412 do not treat the former segmented region as a region (image change region) which includes an image of a moving object but the latter segmented region as an image change region.

The processing 401 initializes to 0 the variables Xb and Yb representing the serial numbers along the X and Y directions assigned to a segmented region to be processed. The processing 402 examines whether the value of the element corresponding to the segmented region (X, Y) in the movement characteristics region data 5-14 is 1. The program moves to the processing 403 if the value is 1, and to the processing 406, if it is not 1. The processing 403 judges whether the representative colors of the segmented region (X, Y) have changed among plural frames. That is, it is examined whether the value of the element corresponding to the segmented region (X, Y) in the region-representative color data 5-18 of the further preceding frame is equal to the value of the element corresponding to the segmented region (X, Y) in the region-representative color data 5-16, and at the same time, the value of the element corresponding to the segmented region (X, Y) in the region-representative color data 5-17 of the preceding frame is equal to the value of the element corresponding to the segmented region (X, Y) in the region-representative color data 5-16. If the segmented region (X, Y) fulfills these two conditions, the representative color of the segmented region has not changed among the three frames from the further preceding frame to the current frame. The embodiment presumes that the segmented region (X, Y) fulfills the two conditions in the following two cases. First is a case where the image of this segmented region contains an image of a moving object which halts substantially at the same position. The other is a case where the background of the segmented region and the moving object in the region are the same, as when the background of the segmented region includes leaves of trees shaking due to the wind and the background has been detected as an moving object.

The program moves to the processing 404 if the segmented region (X, Y) fulfills the two conditions, and to the processing 407 if the segmented region does not fulfill the two conditions. The processing 404 examines whether the value of Xb is not less than 1 and not greater than 14 and the value of Yb is not less than 1 and not greater than 10, in order to avoid the execution of the processing of the outermost region in the processing 405. The program moves to the processing 405 if Xb and Yb fulfill these conditions, and to the processing 406 if Xb and Yb do not fulfill these conditions.

The processing 405 judges whether the image in this segmented region contains an image of a moving object which halts substantially at the same position. That is, as will be explained later on, the route region data 5-21 includes an element corresponding to each segmented region and non-zero data is written into an element of the route region data 5-21 which corresponds to a segmented region, when the segmented region has been judged as a passing point of a moving object. The processing 405 examines whether the four elements of the route region data 5-21 corresponding to the four neighboring segmented regions (X−1, Y), (X+1, Y), (X, Y−1) and (X, Y+1) of a segmented region (X, Y) under processing are all 0. If either one of these four elements of the route region data 5-21 is 1, it means that it has been detected by the image of the preceding frame that the moving object passed through the one segmented region. In this case, the segmented region under processing will be very close to the moving route of the moving object. Therefore, it is guessed that the representative color of the segmented region (X, Y) under processing fulfills the condition of the processing 403 because this segmented region holds an image of a moving object which substantially halts. Therefore, the segmented region (X, Y) under processing is treated as an image change region which includes an image of a moving object in question, if this segmented region fulfills the two conditions of the processing 403 and not the condition of the processing 405.

On the other hand, when the segmented region under processing fulfills both the two conditions of the processing 403 and the condition of the processing 405, it is judged that this segmented region contains an image of a shaking object like the leaves of trees, that the representative color of this segmented region represents a color of a lot of leaves in the background and that, therefore, the representative color has not changed over plural frames. Therefore, the program moves to the processing 406 if the segmented region under processing fulfills the condition of the processing 405, and the processing 406 regards that there has been no change in the image which originates from the moving object in question, writes 0 in the element of the image change regions data 5-19, corresponding to this segmented region (X, Y), and moves to the processing 408.

The program moves to the processing 407 if the segmented region under processing does not fulfill the condition of the processing 405. The processing 407 assumes that there has been a change in the image in this segmented region which originates from the moving object in question, writes 1 in that element of the image change regions data 5-19, and moves to the processing 408. When the value of the element of the image change regions data 5-19 corresponding to a segmented region is 1, the segmented region will be called an image change region. The processings 408 to 412 form the address update processing to execute the above-mentioned processing to all regions.

As the image change region is extracted like this, it is possible to prevent a segmented region which contains movement in the image like shaking of leaves of trees from being extracted as an image change region. Moreover, it is possible to judge a segmented region which contains movement which reflects a halting person, as an image change region, by examining whether there is one adjacent route region data which has a value of one. As will be explained later on, an image change region detected by the image change region extraction processing 400 is used to detect the passing point of the moving object in present frame image.

When it is judged that a segmented region under processing includes an image of a moving object which substantially halts, it is expected that other segmented regions separated a little from that segmented region are sure to include the image of the same moving object. However, it occurs often that these other segmented regions are not adjacent to the moving route already extracted. In that case, these other segmented regions are not judged as image change regions, because they fulfill the condition of the processing 405. Therefore, the image change region extraction processing 400 judges only part of the segmented regions which contain the image of the moving object which substantially halts, as image change regions. That part of image change regions as detected can be used as it is, for detection of the passing points of the moving object in the present frame image, as will be explained later. Therefore, it does not become a problem with the detection of the passing point that only part of image change regions are detected.

The processings 413 to 419 (FIG. 16) are the update processing of the region-representative color data 5-18 of the further preceding frame and the region-representative color data 5-17 of the preceding frame. The processing 413 initializes to 0 the variables Xb and Yb representing the serial numbers along the X and Y directions assigned to a segmented region to be processed. The processing 414 assigns the element of the region-representative color data 5-18 of the preceding frame corresponding to the segmented region (Xb, Yb) into the element of the region-representative color data 5-18 of the further preceding frame corresponding to the segmented region (Xb, Yb), and assigns the element of the region-representative color data 5-16 corresponding to the segmented region (Xb, Yb) into the element of the region-representative color data 5-17 of the preceding frame corresponding to the segmented region (Xb, Yb). The processings 415 to 419 form the address update processing to execute the above-mentioned processing to all segmented regions.

(4d) Route Extraction Processing 500

The image change regions detected by the image change regions extraction processing 400 can be regarded as ones which hold the image of the moving object in question. The position of the center of the figure represented by these image change regions is treated as a passing point of the moving object in the present embodiment. The processings 500 to 533 (FIGS. 17 and 18) are ones which extract the image change region which is located at the center of the figure represented by these image change regions, as a present passing point of the moving object in question.

The processing 501 initializes to 0 the variables Xb and Yb representing the serial numbers along the X and Y directions assigned to a segmented region to be processed and the variables bottom representing the lowest position of the above mentioned figure. The processing 502 examines whether the value of the element of the image change regions data 5-19 corresponding to the segmented region (X, Y) under processing is 1, that is, whether the segmented region is an image change region. The program moves to the processing 503 if the element is 1 and to the processing 504 if not. The processing 503 writes the value of Yb into the variable bottom, and the program moves to the processing 509. The processings 504 to 508 form the address update processing to execute the above-mentioned processing to all the regions only when the value of the element of the image change regions data 5-19 corresponding to the segmented region (X, Y) under processing is not 1. In this address update processing, the address is sequentially updated from a smaller value of the variable Yb. As a result, when a segmented region is judged first as an image change region, the serial number in the Y direction of the segmented region shows the lowest position of the figure represented by the image change regions as detected by the image change regions extraction processing 400.

The processing 509 initializes to 0 the variables Xb and top used in the processings 510 to 516, and initializes to 11 the variable Yb used in the processings 510 to 516. The processing 510 examines whether the value of the element of the image change regions data 5-19 corresponding to the segmented region (X, Y) under processing is 1. The program moves to the processing 511 if the value is 1, and to the processing 512 if not. The processing 511 writes the value of Yb into the variable top and moves to the processing 517. The processings 512 to 516 form the address update processing to execute above-mentioned processing to all the regions. In this address update processing, the address is sequentially updated from a larger value of the variable Yb. As a result, when a segmented region is judged as an image change region first, the serial number in the Y direction of the segmented region shows the uppermost position of the figure represented by the image change regions as detected by the image change regions extraction processing 400.

The processing 517 initializes to 0 the variables Xb, Yb and left used in the processings 518 to 524. The processing 518 examines whether the value of the element of the image change regions data 5-19 corresponding to the segmented region (X, Y) under processing is 1. The program moves to the processing 519 if the element is 1 and to the processing 520 if not. The processing 519 assigns the value of Xb into the variable left and moves to the processing 525. The processings 520 to 524 form the address update processing to execute the above-mentioned processing to all regions. In this address update processing, the address is sequentially updated from a smaller value of the variable Xb. As a result, when a segmented region is judged as an image change region first, the serial number in the X direction of the segmented region shows the leftmost position of the figure represented by the image change regions as detected by the image change regions extraction processing 400.

The processing 525 initializes to 0 the variables Yb and right used in the processings 526 to 532, and initalizes to 15 the variable Xb used in the processings 526 to 532. The processing 526 examines whether the value of the element of the image change regions data 5-19 corresponding to the segmented region (X, Y) under processing is 1. The program moves to the processing 527 if the element is 1, and to the processing 528 if not. The processing 527 assigns the value of Xb into the variable right, and the program moves to the processing 533. The processings 528 to 532 form the address update processing to execute the above-mentioned processing to all regions. In this address update processing, the address is sequentially updated from a large value of the variable Xb. As a result, when a segmented region is judged as an image change region first, the serial number in the X direction of the segmented region shows the rightmost position of the figure represented by the image change regions as detected by the image change regions extraction processing 400.

The processing 533 obtains the serial numbers in the X and Y directions of a segmented region which is located at the center of the image represented by the image change regions, based upon the average of the obtained values-of the variables bottom and top and the average of the obtained values of the variables left and right, and adds 1 to the value of the element of the route region data 5-21 corresponding to this segmented region. When the value of the element of the route region data 5-21 corresponding to this segmented region up until then is 0, the value of the element is changed to 1. The value of the element of the route region data 5-21 corresponding to this segmented region up until then will already not be 0 when the moving object passes through the same segmented region many times or stays long in the same segmented region. In this case, the value of the A element of the route region data 5-21 corresponding to this segmented region becomes larger by the processing 533. Therefore, the route region data 5-21 contains information on the stay time of the moving object in the same segmented region.

The processings 534 to 548 (FIG. 19) are ones which generate the route image data 5-22. The processing 534 initializes to 0 the variables Xb and Yb representing the serial numbers along the X and Y directions assigned to a segmented region to be processed and the variables i and j representing the serial numbers along the X and Y directions assigned to a pixel to be processed within the segmented region. The processing 535 examines whether the value of the element of the route region data 5-21 corresponding to the segmented region (X, Y) is 0. The program moves to the processing 536 if the value is not 0 and to the processing 537 if the value is 0.

The processing 536 assigns the value of the element of the route region data 5-21 corresponding to the segmented region (Xb, Yb) into the element of the route transparency degree data 5-22-4 corresponding to the pixel (Xb×10+i, Yb×10+j), writes three color component data required to display the route in a predetermined color, into the elements of the route red image data 5-22-1, the route green image data 5-22-2 and the route blue image data 5-22-3, corresponding to the same pixel. The program moves to processing 538. In the present embodiment, a numerical value 255 is written into the route green image data 5-22-2 and 0 is written into the other route image data 5-22-1, 5-22-3, so as to display the route in green. The value 255 can be changed properly. The processing 537 writes 0 into the elements of all the route image data 5-22-1 to 5-22-3 corresponding to the pixel (Xb×10+i, Yb×10+j) because the segmented region (Xb, Yb) is not on the route, and the program moves to the processing 538. The processings 538 to 548 form the address update processing to execute the above-mentioned processing to all pixels.

As will be explained later on, the segmented regions located on the route are displayed in translucent color in a overlapping manner to the image of the moving object. The route will be displayed in translucent green in the present embodiment. Because the processing 536 uses the values of the route region data 5-21 as it is, as ones of the route transparency degree data 5-22-4, the value of the route transparency degree data corresponding to a segmented region becomes larger when the moving object passes through the segmented region at plural times or when the stay time of the moving object within the segmented region is longer. In the present embodiment, a segmented region with a larger value of the route transparency degree data is displayed in a deeper translucent color, as will be explained later on. Therefore, the operator can confirm a time factor of the movement of the moving object such as its stay time and so on at a glance.

(4e) Moving Object Image Extraction Processing 600

The processings 601 to 609 (FIG. 20) are ones which extract the image of a moving object when at least part of the moving object is located in a predetermined region within the view of camera 9 or in a corresponding predetermined region within the frame image 50 (FIG. 2). Concretely, in the present embodiment, that predetermined region within the view is a space which is longer than it is wide and is located at the central part of the view of the camera 9, and the corresponding predetermined region within the screen 50 is a slit region which is longer than it is wide and is located at the center of screen 50. The predetermined region within the frame image will be called a moving object image extraction region. That is, the segmented regions (8,0) to (8,12) of the frame image is used as the moving object image extraction region. The present embodiment adopts a method of detecting timing when a predetermined ratio of a moving object has entered the moving object image extraction region and storing the frame image at that timing as the image of the moving object. According to the method, it is possible to store an image of a moving object when the moving object is located at almost the same relative position to the moving object image extraction region, without depending on the size of the moving object.

The processings 601 to 609 are ones which count the total numbers of three image change regions used when the change in the relative position between the moving object and the moving object image extraction region is detected. The processing 601 initializes to the variable Xb representing the serial number along the X direction assigned to a segmented region to be processed which is common to all segmented regions which compose the moving object image extraction region, and initializes to 0 the variable Yb representing the serial number along the Y direction assigned to the segmented region to be processed, and three variables now_count, old_count, and same_count which are related to the number of image change regions included in the moving object image extraction region. The processing 602 examines whether the value of the element corresponding to the segmented region (Xb, Yb) in the image change regions data 5-19 is 1. The program moves to the processing 603 if the value is 1, and to the processing 604 if not. The processing 603 adds 1 to the variable now_count. The variable now_count is one which represents the total number of the image change regions included in the moving object image extraction region in the current frame image.

The processing 604 examines whether the value of the element corresponding to the segmented region (Xb, Yb) in the image change regions data 5-20 of the preceding frame is 1. The program moves to the processing 605 if the value is 1, and to the processing 606 if not. The processing 605 adds 1 to the variable old_count. The variable old_count is one which represents the total number of the image change regions included in the moving object image extraction region in the preceding frame image.

The processing 606 examines whether the value of the element corresponding to the segmented region (Xb, Yb) in the image change regions data 5-19 is 1, and at the same time the value of the element corresponding to the segmented region (Xb, Yb) in the image change regions data 5-20 of the preceding frame is 1, and moves to the processing 607 if the segmented region (Xb, Yb) fulfills the two conditions and to the processing 607 if not. The processing 607 adds 1 to the variable same_count. The variable same_count is one which represents the total number of segmented regions belonging to the moving object image extraction region which have been judged as image change regions in any of the current frame image and the preceding frame image. The processings 608 to 609 form the address update processing to execute the above-mentioned processing to all segmented regions within the moving object image extraction region. In the present example, the moving object image extraction region comprises the segmented regions (8, 0) to (8, 12), so only Y direction address Yb of the segmented regions is updated in this address update processing.

The processings 610 to 619 (FIG. 21) are ones Add which generate the moving object image data. The processing 610 examines whether the variable now_count is 1 or more and at the same time whether the ratio of twice of the variable same_count to the sum of the variable now_count and the variable old_count is not greater than 0.48. The first condition shows that at least part of the image of the moving object of the present frame is held in at least one segmented region in the moving object image extraction region. The left side of the second condition is a parameter which measures the ratio of the part which exists in the moving object image extraction region within the image of the moving object. When the image of the moving object enters the moving object image extraction region for the first time in a certain frame, the left side of the second expression is 0, because the variable same_count is still 0. When the ratio of the part which exists in the moving object image extraction region within the image of the moving object increases afterwards, the left side of the second expression increases. However, when the ratio is not so large, the value of the variable same_count is also small. So, the left side of the second expression takes a value which is considerably smaller than 1. When the ratio becomes larger, both the variables old_count, now_count and same_count approach almost the same values, and the left side of the second condition approaches 1. When this ratio reaches some value, the value of the left side does not change so much. Therefore, the value of the left side of the second expression changes rather significantly when the ratio of the part which exists in the moving object image extraction region within the image of the moving object is not so large. In view of the above features, the present embodiment is constructed so as to store the frame image as the image of the moving object, when the value of the left side of the second expression is not greater than 0.48 which is set to a value a little smaller than half of the saturation value 1 of the left side of the second expression.

The program moves to the processing 611 if the current frame fulfills those two conditions of the processing 610 and to the processing 620 if not. The processing 611 initializes to 0 the variables X and Y representing the X and Y coordinates of a pixel to be processed. The processing 612 assigns the element corresponding to the pixel (X, Y) of the current frame image data 5-5 into the element corresponding to the same pixel of the moving object image data 5-23, and moves to the processing 613. The processing 613 writes the time at that time in the extraction time of moving object image with a route 5-2-3 as the extraction time of moving object image with a route. The processings 614 to 618 form the address update processing to execute the above-mentioned processing to all pixels. The processing 619 assigns 1 into the variable Paste_flag which indicates completion of generation of the moving object image data.

It can happen in a course of repetition of the moving object image extraction processing 600 that a frame image fulfills the two conditions shown in the processing 610 and its succeeding frame image fulfills the same conditions, too. In that case, the processings 612, 613 and 614 are repeated, and the moving object image data 5-23 and the extraction time of the moving object image with a route 5-2-3 are replaced by the moving object image data and the extraction time of the moving object image with a route both extracted for the succeeding frame. Therefore, the moving object image data and the extraction time of the moving object image with a route for the frame image just before the frame image for which the value of the left side of the processing 610 has exceeded 0.48 will be preserved as the moving object image data 5-23 and the extraction time of moving object image with a route 5-2-3.

The processings 620 to 626 (FIG. 22) are the update processing of the image change regions data 5-20 of the preceding frame. The processing 620 initializes to 0 the variables Xb and Yb representing the serial numbers along the X and Y directions assigned to a segmented region to be processed. The processing 621 assigns the element corresponding to the segmented region (Xb, Yb) in the image change regions data 5-19 into the element corresponding to the segmented region (Xb, Yb) in the image change regions data 5-20 of the preceding frame, and moves to the processing 622. The processings 622 to 626 form the address update processing to execute the above-mentioned processing to all the segmented regions.

(4f) Processing 700 of Displaying a Moving Object Image With a Route

The processings 700 to 708 (FIG. 23) are ones which count the total number of the image change regions which exist in the frame screen, based upon the image change regions data 5-19. The processing 701 initializes to 0 the variables Xb and Yb representing the serial numbers along the X and Y directions assigned to a segmented region to be processed and the variable all_count representing a total number of the image change regions. The processing 702 examines whether the element corresponding to the segmented region (Xb, Yb) in the image change regions data 5-19 is 1, and moves to the processing 703, if the element is 1, and to the processing 704 if not. The processing 703 adds 1 to the variable all_count and moves to the processing 704. The processings 704 to 708 form the address update processing to execute the above-mentioned processing to all segmented regions. Thus, the variable all_count shows the total number of the image change regions which exist in the present frame screen. The total number is used in the processing described below to detect the timing at which the moving object has exited outside of the view of the camera 9.

The processings 709 to 716 and 718 to 726 (FIG. 24) are ones which generate and display the moving object image with a route 5-2-2. In the present embodiment, the data of a moving object image with a route 5-2-2 is generated, when the moving object leaves from the screen after it entered the moving object image extraction region, by synthesizing a half-reduced image of the moving object image data 5-23 and a half-reduced image of the route image data 5-22. At this time, the moving object image data 5-23 and the route image data 5-22 are synthesized so that the route image is displayed in a translucent color in an overlapping manner with the image of the moving object.

First of all, after extraction of the image of the moving object, the processing 709 judges whether the variable Paste_flag is 1 and at the same time the variable all_count is 0 in order to examine whether the moving object has exited from the screen. The program moves to the processing 710 if the current frame image fulfills the two conditions, and to the processing 100 if not.

The processing 710 initializes to 0 the variables X and Y representing X and Y coordinates of a pixel to be processed. The processing 711 adds a first product of the weight $\alpha$, the element corresponding to the pixel (X×2, Y×2) of each color component data 5-22-1, 5-22-2 or 5-22-3, and the element corresponding to the pixel (X×2, Y×2) of the route transparency degree data 5-22-4 within the route image data 5-22 to a second product of the weight 1−$\alpha$, the element corresponding to the pixel (X×2, Y×2) in the color component data 5-23-1, 5-23-2 or 5-23-3 within the moving object image data 5-23, and the element corresponding to the pixel (X×2, Y×2) in the route transparency degree data 5-22-4 within the route image data 5-22. The processing 711 further assigns the resultant color component data into the element corresponding to the pixel (X, Y) of the data of a moving object image with a route 5-5-2. The weight $\alpha$ is of a suitable value smaller than 1 and larger than 0. The processing 711 is executed for each color component of red, green and blue. Thus, the image data to display the route image in a translucent color in an overlapping manner with the image of the moving object is obtained. As is clear from the above calculation, the larger the value of the element of the route transparency degree data 5-22-4 is, the deeper translucent color used to display the route is. The processings 712 to 716 form the address update processing to execute the above-mentioned processing to all pixels. Thus, the data of a moving object image with a route 5-2-2 is generated. At this time, the identification number of a moving object image with a route 55-2-1 is further decided.

The processings 718 to 724 are ones for zero clearing of the route region data 5-21 and variable Paste_flag. The processing 718 initializes to 0 the variables Xb and Yb representing the serial numbers along the X and Y directions assigned to a segmented region to be processed. The processing 719 zero clears the element corresponding to the segmented region (X, Y) in the route region data 5-21. The processings 720 to 724 form the address update processing to execute all of the processing above to all the segmented regions. The processing 725 assigns 0 into the variable Paste_flag, to show that generation of the data of a moving object image with a route has been completed, and moves to the processing 726.

The processing 726 decides the display position X of a moving object image with a route (5-2-4) and the display position Y of a moving object image with a route (5-2-5) to the data of a moving object image with a route 5-2-2 generated by the processing 711, and displays the data of a moving object image with a route 5-2-2 at the decided position in the region 70 of the screen. When there is a moving object image with a route which has already been displayed, the position where the image is to be displayed newly is decided, so that the new moving object image with a route is displayed adjacent to the moving object image already displayed. When processing 726 ends, the program moves to the processing 100 which inputs a new frame image. By those processings mentioned above, an image is generated and displayed which includes an image containing a moving object and a moving route of the moving object added thereto.

As is clear from the explanation above, the present embodiment uses the time variant edges which exist at different positions in not less than two past frames, in detecting the movement characteristics of the moving object. Generally, the monitoring camera is fixed, and therefore, the edges of the background do not move. The edges generated by the background can be removed by using the time variant edges. So, it is possible to extract only the edges of moving portions of an object which invaded into the monitoring zone.

In addition, it is possible to prevent mistaken extraction as an image change region of such a region which includes movement change in the image, like shaking of leaves of trees, by using the color characteristics processing which examines a time change of the color characteristics of each region during extraction of a moving object.

Moreover, it is possible to judge a region which includes movement of a person who halts and does some work as an image change region (route region) of a moving object by using the route region data for its adjacent regions.

In addition, the operator can confirm a time change in the route of a moving object at a glance by displaying the regions which become the route of the moving object in a translucent color and furthermore by displaying those regions where a person has stayed long or the person has passed many times in a deeper translucent color.

The present invention is not limited to the above-mentioned embodiments but can be realized by various embodiments. For instance, the method of detecting the moving object can be achieved by other methods. The embodiment assumes that the moving object image extraction region is located at the center of the screen, but the present invention can be applied to a case where there is another moving object image extraction region which has another position and size. In that case, appropriate change of the initial values set in the processing 601 and the address update processing executed by the processing 608 to 609 will be required.

The technology shown in the above-mentioned embodiment has been applied to a moving object of a passenger, but the technology can be applied to cars or other moving objects. In addition, the above-mentioned technology was applied to the extraction of the image of a moving object moving outdoors and to the extraction of the moving route, but the technology can be applied to an object moving indoors. In addition, the above-mentioned technology presumed that only one moving object exists in the view of the camera at a time, but the basic part of the technology can be applied as it is, to a case where plural objects exist at the same time. In addition, it is also possible to modify the above-mentioned technology so as to enable detection of the image of each of plural moving object and their moving routes when those plural moving objects exist at the same time in the view of the camera.

In the embodiment above, a moving object image with a route was displayed in real time, but it is possible to adopt a method of sequentially storing route images of plural moving objects in the external information storage device 13, and displaying these images sequentially on the screen or at adjacent positions within the same screen.

As is clear from the above explanation, according to the present invention, an image is automatically generated and displayed which has an image of a moving object and an image of a route of the moving object added. So, a monitoring person can easily know an object which has invaded into the monitoring region and its moving route.

What is claimed is:

1. A method of displaying a moving object, comprising the steps of:
   extracting a moving route of a moving object which has entered a view of an imaging device, based on a moving picture signal supplied by said imaging device;
   generating first image data representing an image of said moving route extracted for said moving object;
   generating second image data representing a image of said moving object, based on said moving picture signal; and
   displaying on a display device an overlapped image of said image of said moving object and said image of said moving route extracted for said moving object, based on said first image data and said second image data;
   wherein said extracting step through said displaying step are repeated for at least one other moving object which has entered said view after said moving object, so that another overlapped image is displayed on said display device for said another moving object.

2. A method of displaying a moving object according to claim 1, wherein said second image data representing said moving object is image data representing a reduced image of an image supplied by said imaging device, when said moving object exists within said view; and
   wherein said first image data representing an image of said moving route extracted for said moving object is image data for displaying said moving route in an overlapping manner with said reduced image.

3. A method of displaying a moving object according to claim 1, wherein said displaying step includes the steps of:
   detecting a timing when said moving object exits outside said view, based on said moving picture signal; and
   displaying said overlapped image of said image of said moving object and said image of said moving route extracted for said moving object on said display device at said detected timing.

4. A method of displaying a moving object according to claim 1, wherein a display screen of said display device includes a plurality of segmented regions;
   wherein said step of extracting said moving route of said moving object includes the step of detecting, for a plurality of frames, a plurality of segmented regions to which a plurality of points representative of said moving object belong; and
   wherein said second image data representing said image of said moving route of said moving object includes image data for displaying said plurality of detected segmented regions.

5. A method of displaying a moving object according to claim 4, wherein said first image data representing said image of said moving route of said moving object includes image data for displaying said plurality of segmented regions extracted for said moving object in a translucent color in an overlapping manner with said image of said moving object.

6. A method of displaying a moving object according to claim 4, wherein said second image data representing said moving object includes image data for displaying each of said plurality of segmented regions detected for said moving object in a color which depends on a total number of frames for which said moving object has been detected as existing in said each segmented region.

7. A method of displaying a moving object, comprising the steps of:
   extracting a moving route of a moving object which has entered a view of an imaging device, based on a moving picture signal supplied by said imaging device;
   generating first image data representing an image of said moving route extracted for said moving object;
   generating second image data representing an image of said moving object, based on said moving picture signal; and
   displaying on a display device an overlapped image of said image of said moving object and said image of said moving route extracted for said moving object, based on said first image data and said second image data.

8. A method of displaying a moving object according to claim 7, wherein said second image data representing said moving object is image data representing an image supplied by said imaging device, when said moving object exists within said view; and
   wherein said first image data representing said image of said moving route extracted for said moving object is image data for displaying said moving route in an overlapping manner with said supplied image.

9. A method of displaying a moving object according to claim 8, wherein said first image data representing said image of said moving route of said moving object includes image data for displaying said moving route extracted for said moving object in a translucent color in an overlapping manner with said image of said moving object.

10. A method of displaying a moving object according to claim 8, wherein said second image data representing said moving object is image data representing an image supplied by said imaging device, when said moving object exists in a predetermined region within said view.

11. A system, operable with an imaging device and a display device, for displaying a moving object, comprising:

means for extracting a moving route of a moving object which has entered a view of said imaging device, based on a moving picture signal supplied by said imaging device;

means for generating first image data representing an image of said moving route extracted for said moving object;

means for generating second image data representing an image of said moving object, based on said moving picture signal; and means for causing said display device to display an overlapped image of said image of said moving object and said image of said moving route extracted for said moving object, based on said first image data and said second image data;

wherein said extracting means through said causing means operate repeatedly for at least one other moving object which has entered said view after said moving object, so that another overlapped image is displayed on said display device for said another moving object.

12. A system for displaying a moving object according to claim 11, wherein said second image data representing said moving object is image data representing a reduced image of an image supplied by said imaging device, when said moving object exists within said view; and wherein said first image data representing an image of said moving route extracted for said moving object is image data for displaying said moving route in an overlapping manner with said reduced image.

13. A system for displaying a moving object according to claim 11, wherein said causing means includes:

means for detecting a timing when said moving object exits outside said view, based on said moving picture signal; and means for causing said display device to display said overlapped image of said image of said moving object and said image of said moving route extracted for said moving object at said detected timing.

14. A system for displaying a moving object according to claim 11, wherein a display screen of said display device includes a plurality of segmented regions;

wherein said extracting means includes means for detecting, for a plurality of frames, a plurality of segmented regions to which a plurality of points representing said moving object belong; and wherein said second image data representing said image of said moving route of said moving object includes image data for displaying said plurality of detected segmented regions.

15. A system for displaying a moving object according to claim 14, wherein said first image data representing said image of said moving route of said moving object includes image data for displaying said plurality of segmented regions extracted for said moving object in a translucent color in an overlapping manner with said image of said moving object.

16. A system for displaying a moving object according to claim 14, wherein said second image data representing said moving object includes image data for displaying each of said plurality of segmented regions detested for said moving object in a color which depends on a total number of frames for which said moving object has been detected as existing in said each so segmented region.

17. A system for displaying a moving object according to claim 14, wherein said means for detecting a plurality of segmented regions includes:

means for detecting, for each of a plurality of frames, a plurality of time variant edge pixels which belong to a plurality of time variant edges which change their positions with time, among a plurality of edges of at image of a plurality of objects which contain said moving object, as supplied by said imaging device for said each frame;

means for detecting, for each of said plurality of frames, a plurality of segmented regions where a plurality of edges of an image representing said moving object exist, based on positions of said plurality of time variant edge pixels as detected for said each frame; and means for detecting, for each of said plurality of frames, one segmented region where a point representative of said moving object for said each frame exists, based on positions of said plurality of segmented regions as detected for said each frame.

18. A system for displaying a moving object according to claim 17, wherein said means for detecting a plurality of segmented regions where a plurality of edges exist includes means for detecting, for each of said plurality of frames, a plurality of segmented regions where said edges of said image of said moving object exist, based on a plurality, of positions of said plurality of times variant edge pixels as detected for said each frame, and on a plurality of positions of said plurality of time variant edge pixels as detected for at least one frame preceding said each frame.

19. A system for displaying a moving object according to claim 17, further comprising means for determining, for each of said plurality of frames, a color representative of each segmented region, based on colors of a plurality of pixels belonging to said each segmented region;

wherein said means for detecting a plurality of segmented regions where a plurality of edges exist includes means for detecting, for each of said plurality of frames, a plurality of segmented regions where said edges of said image of said moving object exist, based on a plurality of positions of said plurality of time variant edge pixels as detected for said each frame, and on a color representative of each segmented region as detected for each of said each frame and plural frames preceding said each frame.

20. A system for displaying a moving object according to claim 17, wherein said means for detecting a plurality of segmented regions where a plurality of edges exist includes means for detecting, for each of said plurality of frames, a plurality of segment regions where a plurality of edges of said image of said moving object exist, based on a plurality of positions of said plurality of time variant edge pixels as detected for said each frame, and on a position of at least one segmented region where a point representative of said moving object exists, as detected for at least one frame preceding said each frame.

21. A system for displaying a moving object according to claim 11, wherein a display screen of said display device includes a plurality of segmented regions; and wherein said extracting means includes:

means for extracting movement characteristics of each segmented region, for each of a plurality of frames;

means for extracting color characteristics of each segmented regions, for each of said plurality of frames;

means for judging, for each of said plurality of frames, whether a moving object exists in each segmented regions, based on said movement characteristics extracted for said each frame for said each segmented region, and on said color characteristics extracted for each of said each frame and a plurality of frames preceding said each frame for said each segmented regions; and means for detecting a position of a moving object for each of said plurality of frames, based a result of judgement by said judging means for said each frame.

22. A system for displaying a moving object according to claim 21, wherein said movement characteristics of each segmented region relate to whether a time variant part of said image supplied by said imaging device is included in said each segmented region, and said color characteristics of each segmented region relate to a representative color of said each segmented region.

23. A system for displaying a moving object according to claim 22, wherein said judging means includes means for judging, for each of said plurality of frames, whether a moving object exists in each segmented region, based on said movement characteristics extracted for said each frame for said each segmented region, on said color characteristics extracted for each of said each frame and a plurality of frames preceding said each frame for said each segmented region, and on whether a moving route of said moving object as extracted for a frame preceding said each frame exists in one of a plurality of segmented regions neighboring to said each segmented region.

24. A system, operable with an imaging device and a display device, for displaying a moving object, comprising a computer;

wherein said computer is programmed to:
  extract a moving route of a moving object which has entered a view of said imaging device, based on a moving picture signal supplied by said imaging device;
  generate first image data representing an image of said moving route extracted for said moving object;
  generate second image data representing an image of said moving object, based on said moving picture signal; and
  cause said display device to display an overlapped image of said image of said moving object and said image of said moving route extracted for said moving object, based on said first image data and said second image data;

wherein said computer repeats said extracting through said causing for at least one other moving object which has entered said view after said moving object, so that another overlapped image is displayed on said display device for said another moving object.

25. A computer-readable medium having recorded thereon a computer program for a system, operable with an imaging device and a display device, for displaying a moving object, said system comprising a computer, said computer program including instruction for causing the computer to:

extract a moving route of a moving object which has entered a view of said imaging device, based on a moving picture signal supplied by said imaging device;
  generate first image data representing an image of said moving route extracted for said moving object;
  generate second image data representing an image of said moving object, based on said moving picture signal; and
  cause said display device to display an overlapped image of said image of said moving object and said image of said moving route extracted for said moving object, based on said first image data and said second image data;

wherein said computer repeats said extracting through said causing for at least one other moving object which has entered said view after said moving object, so that another overlapped image is displayed on said display device for said another moving object.

26. A method of displaying a moving object according to claim 1, wherein said overlapped image for said moving object and said another overlapped image for said another moving object are displayed adjacent to each other on said display device.

27. A method of displaying a moving object according to claim 1, wherein said overlapped image for said moving object and said another overlapped image for said another moving object are displayed sequentially on said display device.

28. A system for displaying a moving object according to claim 11, wherein said overlapped image for said moving object and said another overlapped image for said another moving object are displayed adjacent to each other on said display device.

29. A system for displaying a moving object according to claim 11, wherein said overlapped image for said moving object and said another overlapped image for said another moving object are displayed sequentially on said display device.

30. A system for displaying a moving object according to claim 24, wherein said overlapped image for said moving object and said another overlapped image for said another moving object are displayed adjacent to each other on said display device.

31. A system for displaying a moving object according to claim 24, wherein said overlapped image for said moving object and said another overlapped image for said another moving object are displayed sequentially on said display device.

32. A computer-readable medium according to claim 25, wherein said overlapped image for said moving object and said another overlapped image for said another moving object are displayed adjacent to each other on said display device.

33. A computer-readable medium according to claim 25, wherein said overlapped image for said moving object and said another overlapped image for said another moving object are displayed sequentially on said display device.

34. A system, operable with an imaging device and a display device, for displaying a moving object, comprising:
  means for extracting a moving route of a moving object which has entered a view of said imaging device, based on a moving picture signal supplied by said imaging device;
  means for generating first image data representing an image of said moving route extacted for said moving object;
  means for generating second image data representing an image of said moving object, based on said moving picture signal; and
  means for causing on said display device to display an overlapped image of said image of said moving object and said image of said moving route extracted for said moving object, based on said first image data and said second image data.

35. A system for displaying a moving object according to claim 34, wherein said second image data representing said moving object is image data representing an image supplied by said imaging device, when said moving object exists within said view; and wherein said first image data representing said image of said moving route extracted for said moving object is image data for displaying said moving route in an overlapping manner with said supplied image.

36. A system for displaying a moving object according to claim 35, wherein said first image data representing said image of said moving route of said moving object includes image data for displaying said moving route extracted for said moving object in a translucent color in an overlapping manner with said image of said moving object.

37. A system for displaying a moving object according to claim 35, wherein said second image data representing said moving object is image data representing an image supplied by said imaging device, when said moving object exists in a predetermined region within said view.

* * * * *